US009628294B1

(12) United States Patent
Brandwine et al.

(10) Patent No.: US 9,628,294 B1
(45) Date of Patent: *Apr. 18, 2017

(54) METHODS AND APPARATUS FOR REMAPPING PUBLIC NETWORK ADDRESSES ON A NETWORK TO AN EXTERNAL NETWORK VIA A PRIVATE COMMUNICATIONS CHANNEL

(75) Inventors: Eric J. Brandwine, Haymarket, VA (US); Andrew B. Dickinson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 643 days.

This patent is subject to a terminal disclaimer.

(21) Appl. No.: 13/069,719

(22) Filed: Mar. 23, 2011

(51) Int. Cl.
*H04L 12/46* (2006.01)
*H04L 29/06* (2006.01)

(52) U.S. Cl.
CPC ...... *H04L 12/4641* (2013.01); *H04L 63/0272* (2013.01)

(58) Field of Classification Search
USPC .......................... 370/392, 351, 389; 709/245
See application file for complete search history.

(56) References Cited

U.S. PATENT DOCUMENTS

| 3,662,110 A | 5/1972 | Van Fossen et al. |
| 3,899,775 A | 8/1975 | Larsen |
| 4,259,549 A | 3/1981 | Stehman |
| 4,488,288 A | 12/1984 | Turner |
| 4,494,230 A | 1/1985 | Turner |
| 4,506,358 A | 3/1985 | Montgomery |
| 4,796,292 A | 1/1989 | Thomas |
| 4,993,014 A | 2/1991 | Gordon |
| 5,089,954 A | 2/1992 | Rago |
| 5,113,499 A | 5/1992 | Ankney et al. |
| 5,168,498 A | 12/1992 | Adams et al. |
| 5,185,785 A | 2/1993 | Funk et al. |

(Continued)

OTHER PUBLICATIONS

Amazon Elastic Compute Cloud (Amazon EC2) © 2010, Amazon Web Services LLC or its affiliates http://aws.amazon.com/ec2/ [downloaded Jan. 11, 2011] pp. 1-11.

(Continued)

*Primary Examiner* — Hassan Phillips
*Assistant Examiner* — Saba Tsegaye
(74) *Attorney, Agent, or Firm* — Robert C. Kowert; Meyertons, Hood, Kivlin, Kowert & Goetzel, P.C.

(57) ABSTRACT

Methods and apparatus for remapping IP addresses of a network to endpoints within a different network. A provider network may allocate IP addresses and resources to a customer. The provider network may allow the customer to remap an IP address to an endpoint on the customer's network. When a packet is received from a client addressed to the IP address, the provider network may determine that the IP address has been remapped to the endpoint. The provider network may translate the source and destination addresses of the packet and encode the packet for transmission over a private communications channel. The encoded packet may be sent to the endpoint via the private communications channel over an intermediate network. Response traffic may be routed to the client through the provider network, or may be directly routed to the client by the customer network.

35 Claims, 16 Drawing Sheets

(56) References Cited

U.S. PATENT DOCUMENTS

| | | | |
|---|---|---|---|
| 5,329,572 A | | 7/1994 | Martens |
| 5,410,585 A | | 4/1995 | Kawaharata |
| 5,414,752 A | | 5/1995 | Jonsson |
| 5,438,568 A | | 8/1995 | Weisser, Jr. |
| 5,485,505 A | | 1/1996 | Norman et al. |
| 5,487,139 A | | 1/1996 | Saylor et al. |
| 5,515,098 A | | 5/1996 | Carles |
| 5,551,025 A | | 8/1996 | O'Reilly et al. |
| 5,555,553 A | | 9/1996 | Jonsson |
| 5,661,516 A | | 8/1997 | Carles |
| 5,671,224 A | | 9/1997 | Pyhalammi et al. |
| 5,748,484 A | | 5/1998 | Cannon et al. |
| 6,948,003 B1 | * | 9/2005 | Newman et al. ............ 709/250 |
| 7,349,967 B2 | | 3/2008 | Wang |
| 8,230,050 B1 | | 7/2012 | Brandwine et al. |
| 8,369,333 B2 | | 2/2013 | Hao et al. |
| 8,683,019 B1 | * | 3/2014 | Breau ........................... 709/220 |
| 2003/0001883 A1 | * | 1/2003 | Wang ............................. 345/736 |
| 2003/0055933 A1 | | 3/2003 | Ishizaki et al. |
| 2003/0225911 A1 | | 12/2003 | Lee et al. |
| 2006/0126636 A1 | * | 6/2006 | Dooley ............. H04L 29/12283 370/395.3 |
| 2008/0201486 A1 | * | 8/2008 | Hsu et al. ..................... 709/238 |
| 2010/0322255 A1 | | 12/2010 | Hao et al. |

OTHER PUBLICATIONS

"Amazon Virtual Private Cloud Getting Started Guide (API Version Nov. 15, 2010) Get Started with Amazon VPC" http://docs.amazonwebservices.com/AmazonVPC/latest/GettingStartedGuide/ [downloaded Jan. 11, 2011] pp. 1-5.

Amazon Virtual Private Cloud (Amazon VPC) (beta) © 2010, Amazon Web Services LLC or its affiliates http://laws.amazon.com/vpc/ [downloaded Jan. 11, 2011] pp. 1-5.

Feature Guide: Amazon EC2 Elastic IP Addresses © 2010, Amazon Web Services LLC or its affiliates. http://aws.amazon.com/articles/1346 [downloaded Jan. 11, 2011] pp. 1-5.

Amazon Virtual Private Cloud Console User Guide API Version Nov. 15, 2010, Nov. 15, 2010, pp. 1-45.

Amazon Elastic Compute Cloud Developer Guide API Version Nov. 15, 2010, Nov. 15, 2010, pp. 1-52.

Amazon Elastic Compute Cloud Getting Started Guide API Version Nov. 15, 2010, Nov. 15, 2010, pp. 1-41.

Amazon Elastic Compute Cloud User Guide API Version Nov. 15, 2010, , Nov. 15, 2010, pp. 1-279.

Extend Your IT Infrastructure with Amazon Virtual Private Cloud, Amazon webservices, Jan. 2010, pp. 1-6.

Amazon Virtual Private Cloud Developer Guide API Version Nov. 15, 2010, , Nov. 15, 2010, pp. 1-286.

Amazon Virtual Private Cloud Getting Started Guide API Version Nov. 15, 2010, , Nov. 15, 2010, pp. 1-31.

Amazon Virtual Private Cloud Network Administrator Guide API Version Nov. 15, 2010, , Nov. 15, 2010, pp. 1-65.

U.S. Appl. No. 13/069,727, filed Mar. 23, 2011, Eric J. Brandwine, et al.

* cited by examiner

METHODS AND APPARATUS FOR REMAPPING PUBLIC NETWORK ADDRESSES ON A NETWORK TO AN EXTERNAL NETWORK VIA A PRIVATE COMMUNICATIONS CHANNEL

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that spans multiple distinct physical computing systems.

Figure 1:
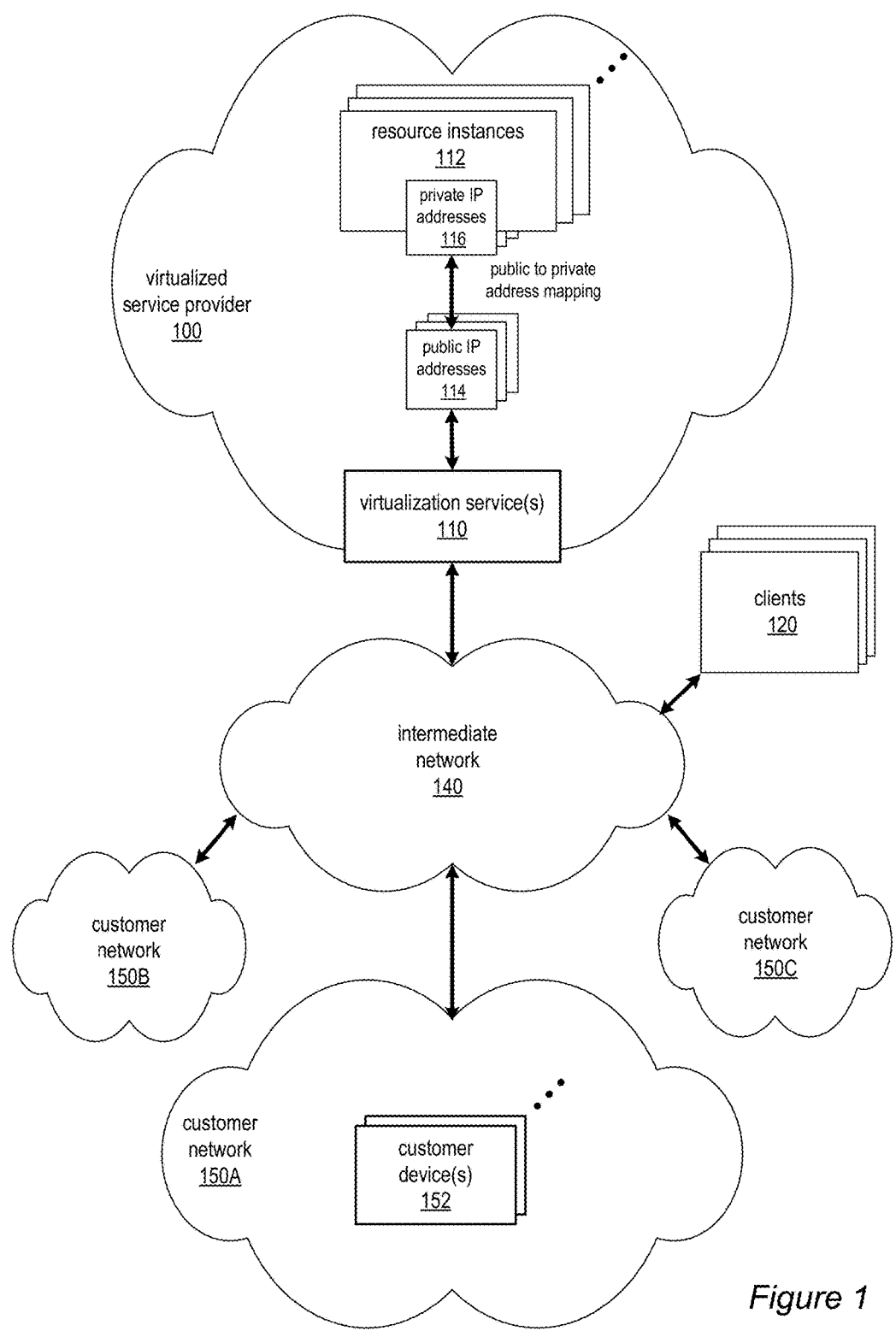
FIG. 1 illustrates an example virtualized service provider environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for remapping Internet Protocol (IP) addresses typically mapped to endpoints within a network environment (e.g., a local network or data center) to endpoints within a different network environment (e.g., a different local network or data center) are described. Embodiments of the methods and apparatus for remapping IP addresses of a network to endpoints within a different network may, for example, enable customers of a provider network that provides resources and public IP addresses for accessing those resource to obtain IP addresses provided by the network and to remap the IP addresses to endpoints on the customer's own, external network, referred to herein as a customer network. The network that provides the resources and public IP addresses (referred to herein as a provider network) recognizes packets received on the network that are addressed to a remapped IP address, translates the source and/or destination addresses, and routes the packets to the endpoint on the customer network rather than to a resource on the provider network. Similarly, the provider network may appropriately translate and route response traffic from an endpoint on a customer network to the correct destination (e.g., a client device). Embodiments may, for example, be implemented in the context of a virtualized service provider that provides virtualized computing resources on a virtualized service provider network to one or more customers via an intermediate network, for example a shared network or a public network such as the Internet.

In this document, a public network may be broadly defined as a network that provides open access to and interconnectivity between a plurality of entities. As noted, the Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a customer network.

Example Provider Network Environment

FIG. 1 illustrates an example virtualized service provider networking environment, according to at least some embodiments. A virtualized service provider 100 may provide resource virtualization to customers via one or more virtualization services 110 that allow customers 150 to purchase, rent, or otherwise obtain instances 112 of virtualized resources including computation and storage resources implemented on devices within a virtualized service provider network or networks in one or more virtualized service provider data centers. Private IP addresses 116 may be associated with the resource instances 112; the private IP addresses are the internal network addresses of the resource instances 112 on the virtualized service provider 100 network. The virtualized service provider 100 may also provide public IP addresses 114 and/or public IP address ranges (e.g., Internet Protocol version 4 (IPv4) or Internet Protocol version 6 (IPv6) addresses) that customers 150 may obtain from the provider 100. Conventionally, the virtualized service provider 100, via the virtualization services 110, may allow a customer (e.g., customer 150A) to dynamically associate at least some public IP addresses 114 assigned to the customer with particular resource instances 112 assigned to the customer. The virtualized service provider 100 may also allow the customer to remap a public IP address 114, previously mapped to one virtualized computing resource instance 112 owned by the customer, to another virtualized computing resource instance 112 that the customer owns. Using the virtualized computing resource instances 112 and public IP addresses 114 provided by the virtualized service provider 100, a customer 150A may, for example, implement customer-specific applications and present the customer's applications on an intermediate network 140. A client 120 on the intermediate network 140 may then generate traffic to a destination public IP address 114 published by the customer 150A; the traffic is routed to the virtualized service provider data center, and at the data center is routed, via a network substrate, to the private IP address 116 of the virtualized computing resource instance 112 currently mapped to the destination public IP address 114. Similarly, response traffic from the virtualized computing resource instance 112 is routed via the network substrate back onto the intermediate network 140 to the source client 120.

Embodiments of the methods and apparatus for remapping IP addresses may, for example, be employed to allow customers 150, for example customer 150A, of virtualized service provider 100 to remap the customer's public IP addresses 114, conventionally mapped to virtualized resource instances 112 in the virtualized service provider 100 data center, to endpoints (e.g., devices 152) at the customer's data center or on the customer's local network. After the customer remaps a public IP address 114 to a device 152 on the customer's network 150A, a client 120 on the intermediate network 140 may generate traffic to the public IP address 114; the traffic, as in the conventional case, is routed to the virtualized service provider 100 data center. Software and/or hardware at the virtualized service provider 100 data center recognizes that the destination public IP address 114 has been remapped to a device 152 on the customer 150A network, and the traffic is routed by the virtualized service provider 100 software and/or hardware to the customer 150A network. In some embodiments, response traffic may be routed from the customer 150A network back to the virtualized service provider 100 data center, and software and/or hardware at the at the virtualized service provider 100 data center may then route the response traffic back onto the intermediate network 140 to the source client 120. In other embodiments, routing of the response traffic to the source client 120 via the intermediate network 140 may instead be handled at the customer network 150A.

In some embodiments, the network traffic to and from a public IP address 114 that has been remapped to a device 152 on a customer network 150A may flow over a private connection, for example a tunnel over the intermediate network 140 between the customer's data center and the virtualized service provider 100 data center, or alternatively over a direct connection between the customer's data center and the virtualized service provider 100 data center. Alternatively, in some embodiments, the network traffic to and from a remapped public IP address 114 may be routed over the intermediate network 140 from the virtualized service provider 100 data center to a device 152 on a customer network 150A.

Private IP addresses, as used herein, refer to the internal network addresses of resource instances in a virtualized service provider network. Private IP addresses are only routable within the virtualized service provider network. Network traffic originating outside the virtualized service provider network are not directly routed to private IP addresses; instead, the traffic uses public IP addresses that are mapped to the resource instances. The virtualized service provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the virtualized service provider or by the customer. Traffic routed to a public IP address is translated, for example via 1:1 network address translation (NAT), and forwarded to the respective private IP address of a resource instance.

Some public IP addresses may be assigned by the virtualized service provider network infrastructure to particular resource instances; these public IP addresses may be referred to herein as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by customers of the virtualized service provider; a customer may then assign their allocated public IP addresses to particular resource instances allocated to the customer. These public IP addresses may be referred to herein as customer public IP addresses, or simply customer IP addresses. Instead of being assigned by the virtualized service provider network to resource instances as in the case of standard IP addresses, customer IP addresses may be assigned to resource instances by the customers, for example via an API provided by the virtualized service provider. Unlike standard IP addresses, customer IP Addresses are allocated to customer accounts and can be remapped to other resource instances when necessary or desired. A customer IP address is associated with a customer's account, not a particular resource instance, and the customer controls that address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Example Virtualized Service Provider Network Environments

This section describes example implementations of virtualized service provider network environments in which embodiments of the methods and apparatus for remapping IP addresses may be implemented. While embodiments are generally described herein in the context of a virtualized service provider that provides, to customers over an intermediate network such as the Internet, virtualized computing resource instances and public IP addresses for communicating with those resource instances, embodiments may be adapted to apply in various other network environments that provide resources and network addresses on local networks to external customers.

Figure 2:
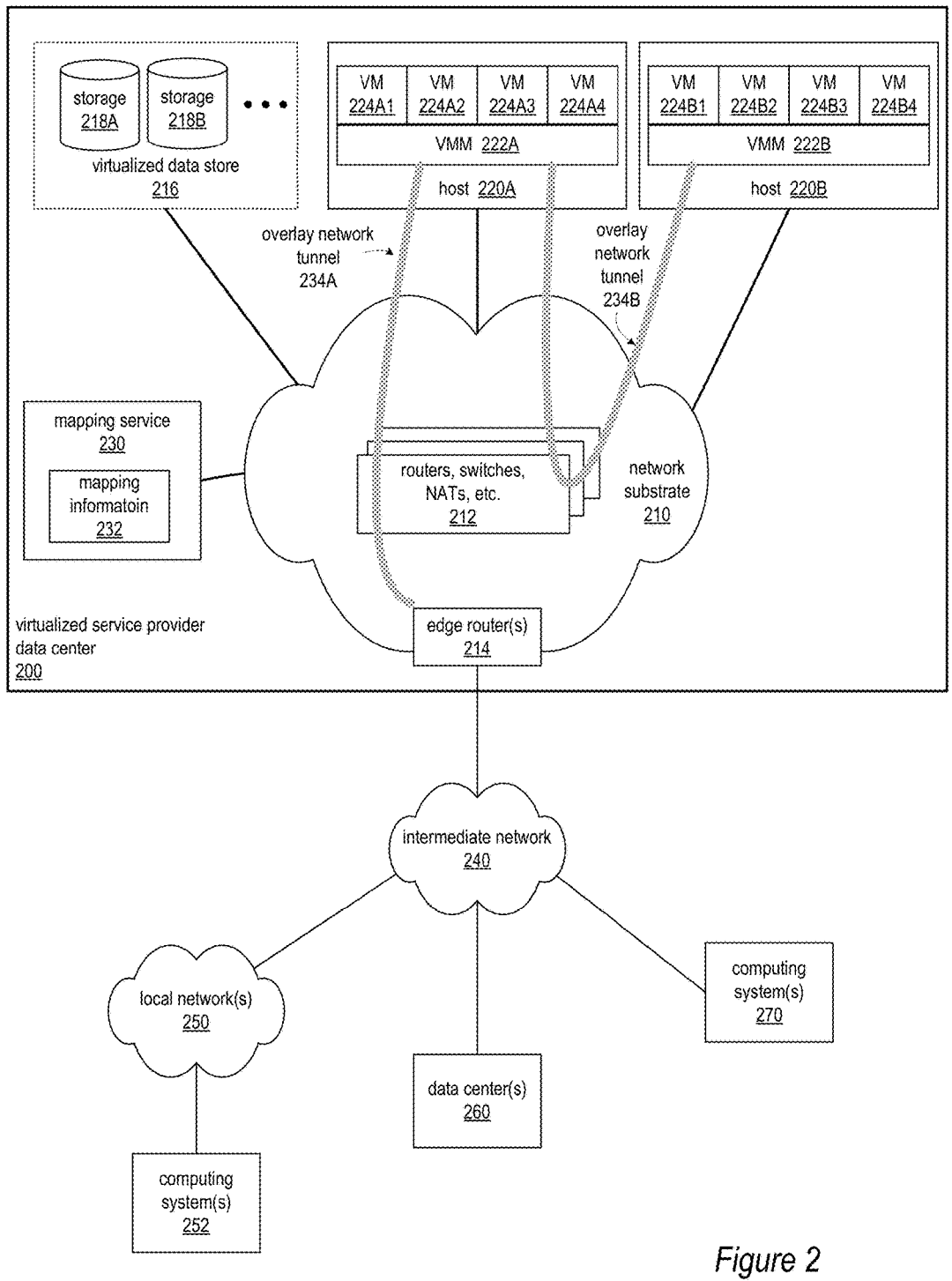
FIG. 2 illustrates an example virtualized service provider data center that implements an overlay network on a network substrate using IP tunneling technology, according to some embodiments.

FIG. 2 illustrates an example virtualized service provider data center that implements an overlay network on a network substrate using IP tunneling technology, according to some embodiments. A virtualized service provider data center 200 may include a network substrate that includes networking devices 212 such as routers, switches, network address translators (NATs), and so on. At least some embodiments may employ an Internet Protocol (IP) tunneling technology to provide an overlay network via which encapsulated packets may be passed through network substrate 210 using tunnels. The IP tunneling technology may provide a mapping and encapsulating system for creating an overlay network on a network (e.g., a local network in data center 200 of FIG. 2) and may provide a separate namespace for the overlay layer (the public IP addresses) and the network substrate 210 layer (the private IP addresses). Packets in the overlay layer may be checked against a mapping directory (e.g., provided by mapping service 230) to determine what their tunnel substrate target (private IP address) should be. The IP tunneling technology provides a virtual network topology; the interfaces that are presented to customers are attached to the overlay network so that when a customer provides an IP address that they want to send packets to, the IP address is run in virtual space by communicating with a mapping service (e.g., mapping service 230) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 2, an example overlay network tunnel 234A from a virtual machine (VM) 224A on host 220A to a device on the intermediate network 250 and an example overlay network tunnel 234B between a VM 224B on host 220B and a VM 224C on host 220C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP addresses) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 2, at least some networks in which embodiments may be implemented may include hardware virtualization technology that enables multiple operating systems to run concurrently on a host computer (e.g., hosts 220A and 220B of FIG. 2), i.e. as virtual machines (VMs) 224 on the hosts 220. The VMs 224 may, for example, be rented or leased to customers of a network provider. A hypervisor, or virtual machine monitor (VMM) 222, on a host 220 presents the VMs 224 on the host with a virtual platform and monitors the execution of the VMs 224. Each VM 224 may be provided with one or more private IP addresses; the VMM 222 on a host 220 may be aware of the private IP addresses of the VMs 224 on the host. A mapping service 230 may be aware of all network IP prefixes and the IP addresses of routers or other devices serving IP addresses on the local network. This includes the IP addresses of the VMMs 222 serving multiple VMs 224. The mapping service 230 may be centralized, for example on a server system, or alternatively may be distributed among two or more server systems or other devices on the network. A network may, for example, use the mapping service technology and IP tunneling technology to, for example, route data packets between VMs 224 on different hosts 220 within the data center 200 network; note that an interior gateway protocol (IGP) may be used to exchange routing information within such a local network.

In addition, a network such as the virtualized service provider data center 200 network (which is sometimes referred to as an autonomous system (AS)) may use the mapping service technology, IP tunneling technology, and routing service technology to route packets from the VMs 224 to Internet destinations, and from Internet sources to the VMs 224. Note that an external gateway protocol (EGP) or border gateway protocol (BGP) is typically used for Internet routing between sources and destinations on the Internet. FIG. 2 shows an example data center 200 implementing a network that provides hardware virtualization technology and that provides full Internet access via edge router(s) 214 that connect to Internet transit providers, according to at least some embodiments. The network may implement IP tunneling technology, mapping service technology, and a routing service technology to, for example, route packets from the VMs 224 on hosts 220 in data center 200 to Internet destinations, and from Internet sources to the VMs 224. Internet sources and destinations may, for example, include computing systems 270 connected to the intermediate network 240 and computing systems 252 connected to local networks 250 that connect to the intermediate network 240 (e.g., via edge router(s) 214 that connect the network 250 to Internet transit providers). The virtualized service provider data center 200 network may also route packets from a VM 224 on a host 220 in data center 200 to other VMs 224 on the same host or on other hosts 220 in data center 200.

A network provider that provides data center 200 may also provide additional data center(s) 260 that include hardware virtualization technology similar to data center 200 and that may also be connected to intermediate network 240. Packets may be forwarded from a VM 224 on a host 220 in data center 200 to another VM on another host in another, similar data center 260, and vice versa.

While the above describes hardware virtualization technology that enables multiple operating systems to run concurrently on host computers as virtual machines (VMs) on the hosts, where the VMs may be rented or leased to customers of the network provider, the hardware virtualization technology may also be used to provide other computing resources, for example storage resources, as virtual resources to customers of a network provider in a similar manner.

Figure 3:
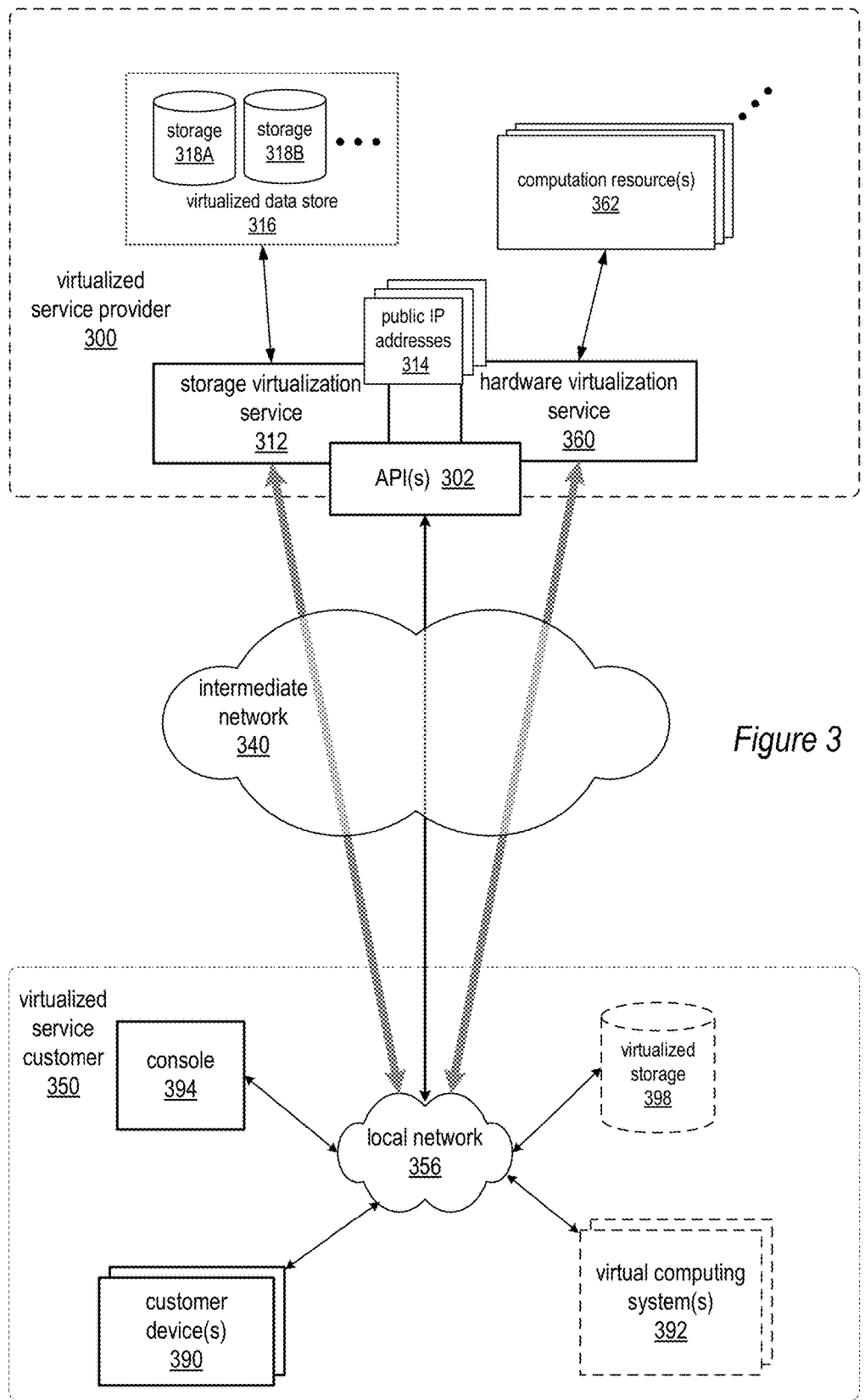
FIG. 3 is a block diagram of an example virtualized service provider that provides a storage virtualization service and a hardware virtualization service to customers, according to at least some embodiments.

FIG. 3 is a block diagram of an example virtualized service provider that provides a storage virtualization service and a hardware virtualization service to customers, according to at least some embodiments. Hardware virtualization service 360 provides multiple computation resources 362 (e.g., VMs) to customers. The computation resources 362 may, for example, be rented or leased to customers of the virtualized service provider 300 (e.g., to virtualized service customer 350). Each computation resource 362 may be provided with one or more private IP addresses. A local network of virtualized service provider 300 may be configured to route packets from the private IP addresses of the computation resources 362 to public Internet destinations, and from public Internet sources to the computation resources 362.

Virtualized service provider 300 may provide a virtual service customer 350, for example coupled to intermediate network 340 via local network 356, the ability to implement virtual computing systems 392 via hardware virtualization service 360 coupled to intermediate network 340 and to the local network of virtualized service provider 300. In some embodiments, hardware virtualization service 360 may provide an API 302, for example a web services interface, via which virtualized service customer 350 may access functionality provided by the hardware virtualization service 360, for example via a console 394. In at least some embodiments, at the virtual service provider 300, each virtual computing system 392 at customer 350 may correspond to a computation resource 362 that is leased, rented, or otherwise provided to virtualized service customer 350.

From an instance of a virtual computing system 392 and/or another customer device 390 or console 394, the customer may access the functionality of storage virtualization service 312, for example via an API 302, to access data from and store data to a virtual data store 316 provided by the virtualized service provider 300. In some embodiments, a virtualized data store gateway (not shown) may be provided at the virtualized service customer 350 that locally caches at least some data, for example frequently accessed or critical data, and that communicates with virtualized data store service 312 via one or more communications channels to upload new or modified data from a local cache so that the primary store of data (virtualized data store 316) is maintained. In at least some embodiments, a user, on a virtual computing system 392 and/or on another customer device 390, may mount and access virtual data store 316 volumes, which appear to the user as local virtualized storage 398.

Figure 4:
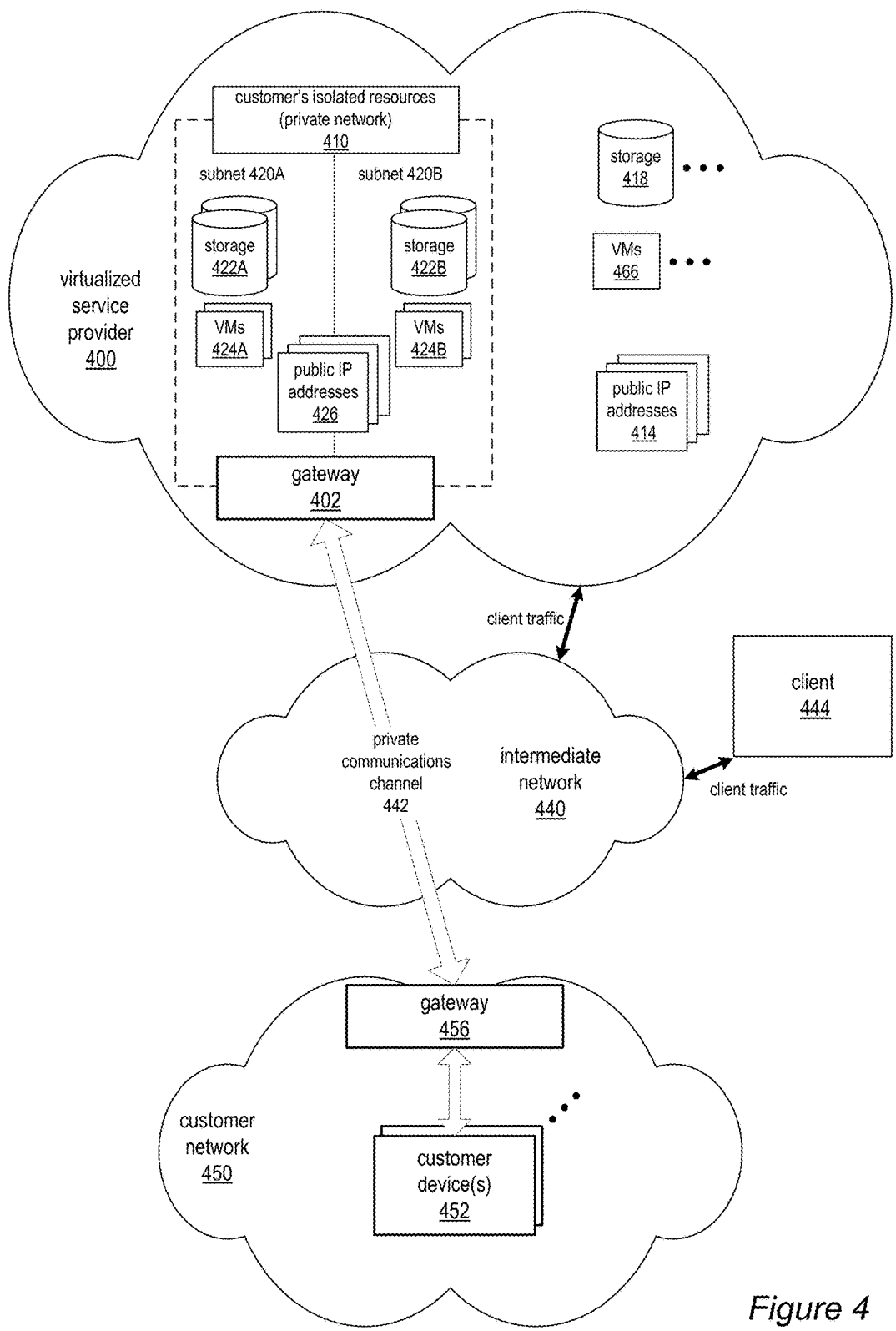
FIG. 4 illustrates an example virtualized service provider that provides private networks on the virtualized service provider network to at least some customers, according to at least some embodiments.

FIG. 4 illustrates an example virtualized service provider that provides private networks on the virtualized service provider network to at least some customers, according to at least some embodiments. A customer private network 410 on a virtualized service provider 400 network, for example, enables a customer to connect their existing infrastructure (e.g., devices 452) on customer network 450 to a set of isolated virtualized service provider resource instances (e.g., VMs 424 and storage 422), and to extend management capabilities such as security services, firewalls, and intrusion detection systems to include their virtualized service provider resource instances. A customer private network 410 may be connected to a customer network 450 via a private communications channel 442. A private communications channel 442 may be a tunnel implemented according to a network tunneling technology or some other peering connection over an intermediate network 440. The intermediate network may, for example, be a shared network or a public network such as the Internet. Alternatively, a private communications channel 442 may be implemented over a direct, dedicated connection between customer private network 410 and customer network 450. To establish a private network 410 for a customer on virtualized service provider 400 network, resource instances (e.g., VMs 424 and storage 422) are allocated to the customer private network 410; a range of public IP addresses 426 are also allocated to the customer private network 410. (Other resource instances (e.g., storage 418 and VMs 466) may remain available on the virtualized service provider 400 network for other customer usage.) In addition, one or more networking devices (routers, switches, etc.) of the virtualized service provider 400 network may be allocated to the customer private network 410. A private communications channel 442 may be established between a gateway 402 at private network 410 and a gateway 456 at customer network 450. Private network 410 may be, but is not necessarily, subdivided into two or more subnets 420. The customer may assign particular customer public IP addresses 426 to particular resource instances in private network 410. A client 444 on intermediate network 440 may then send traffic to a public IP address 426 published by the customer; the traffic is routed, by the virtualized service provider 400 network infrastructure, to the associated resource instance. Return traffic from the resource instance is routed, by the virtualized service provider 400 network infrastructure, back to the client 444 over intermediate network 440. Note that routing traffic between a resource instance and a client 444 may require network address translation to translate between the public IP address and the private IP address of the resource instance.

While FIG. 4 shows client 444 as a client on intermediate network 440 and external to virtual service provider 400 network, a client may be an entity on virtual service provider 400 network. For example, one of the resource instances provided by the virtualized service provider 400 may be a client that sends traffic to a public IP address 426 published by the customer.

Figure 5:
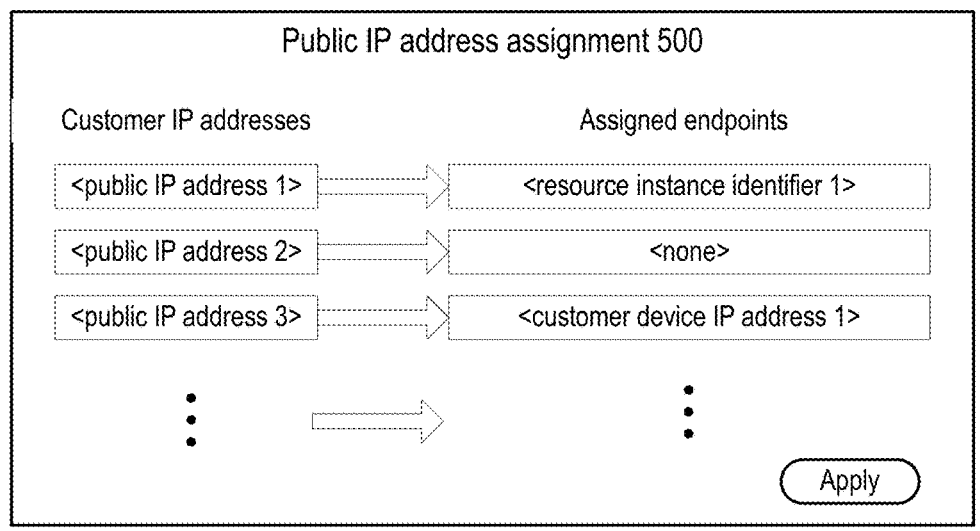
FIG. 5 illustrates an example user interface to an API for assigning customer IP addresses to resource instances or external customer endpoints, according to some embodiments.
Figure 8:
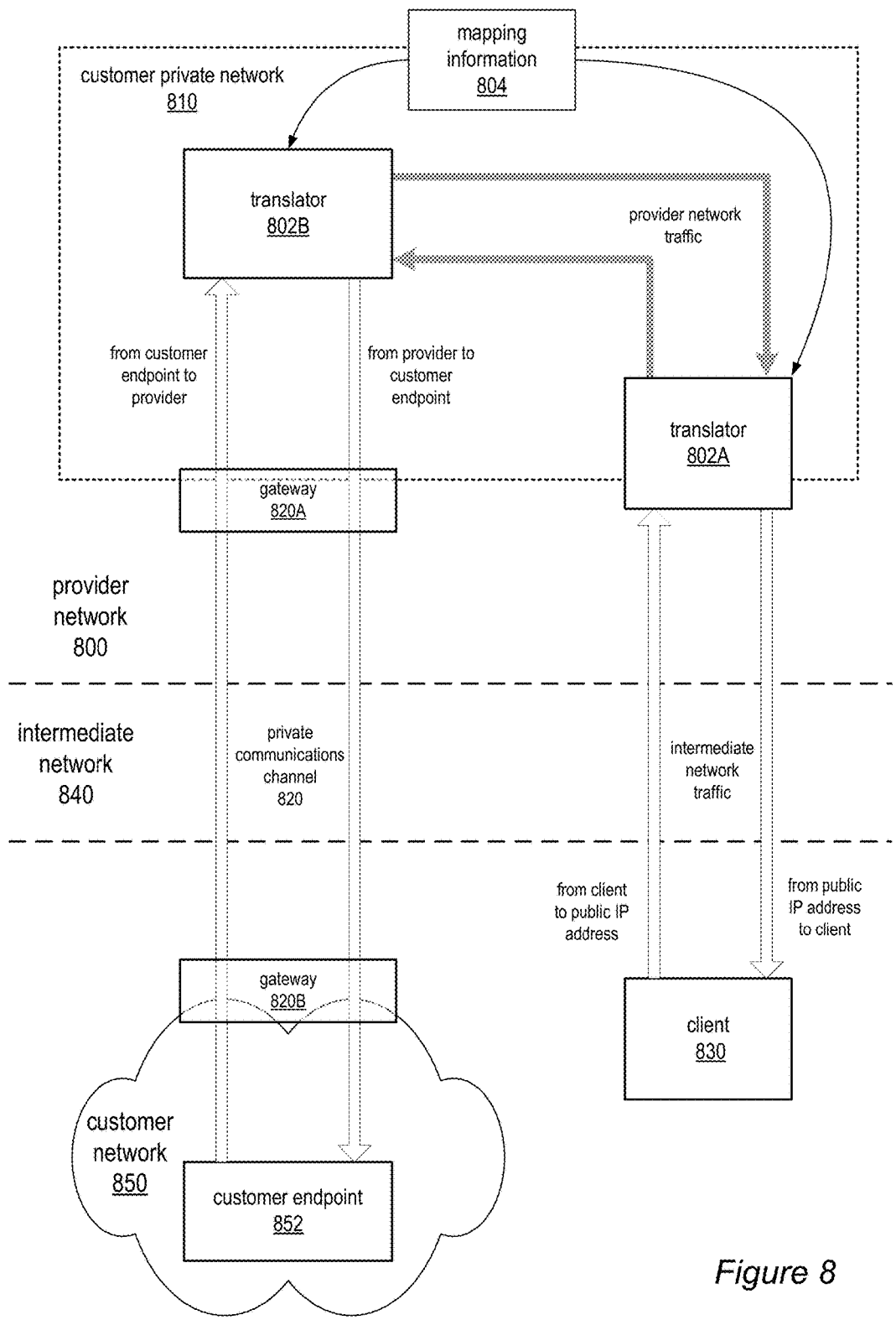
FIG. 8 illustrates remapping public IP addresses in a virtualized service provider network environment that provides private networks to customers, according to some embodiments.

Embodiments of the methods and apparatus for remapping IP addresses may be implemented in a customer's virtualized private network as illustrated in FIG. 4 to enable the remapping of public IP addresses assigned to the customer's virtualized private network to devices on the customer's external network, for example as illustrated in FIGS. 5 and 8.

Remapping Public IP Address on a Network to External Endpoints

In embodiments of the methods and apparatus for remapping IP addresses, a virtualized service provider provides resource instances and customer-assignable public IP addresses (referred to herein as customer IP addresses) to customers, and provides a method or methods (e.g., via an API) via which a customer may assign their customer IP addresses to particular resource instances owned by the customer; in addition, the customer may reassign customer IP addresses to different resource instances. The virtualized service provider maintains a mapping of customer IP addresses to private IP addresses of the resource instances. In addition, the virtualized service provider may provide a method or methods (e.g., via an API) via which the customer may instead assign a customer IP address to a device or endpoint on the customer's own external network, for example in the customer's data center, rather than to a resource instance on the virtualized service provider network. In addition to the mapping of customer IP addresses to private IP addresses of the resource instances, the virtualized service provider may maintain a mapping of the customer IP addresses to the customer endpoints.

FIG. 5 illustrates an example user interface to an API for assigning customer IP addresses to resource instances or external customer endpoints, according to some embodiments. A public IP address assignment user interface 500 may be presented to the customer, for example on a console 394 as illustrated in FIG. 3. The left-hand column may display the customer's assigned public IP addresses. The right-hand column may include text entry boxes, popup menus, or other user interface elements whereby the customer may assign endpoints to the customer IP addresses in the left-hand column. In this example, public IP address 1 has been assigned to resource instance identifier 1, and public IP address 3 has been assigned to customer device IP address 1. Public IP address 2 has not been assigned to an endpoint. The customer may change the assigned endpoints in the right-hand column as necessary or desired. The user interface 500 may include an "Apply" button or similar user interface element that the customer may select to apply changes that have been made to the assigned endpoints. Applying the changes may include, but is not limited to, appropriately updating the mapping information maintained by the virtualized service provider. Note that user interface 500 is given by way of example, and is not intended to be limiting.

Traffic Routing Techniques

Figure 6A:
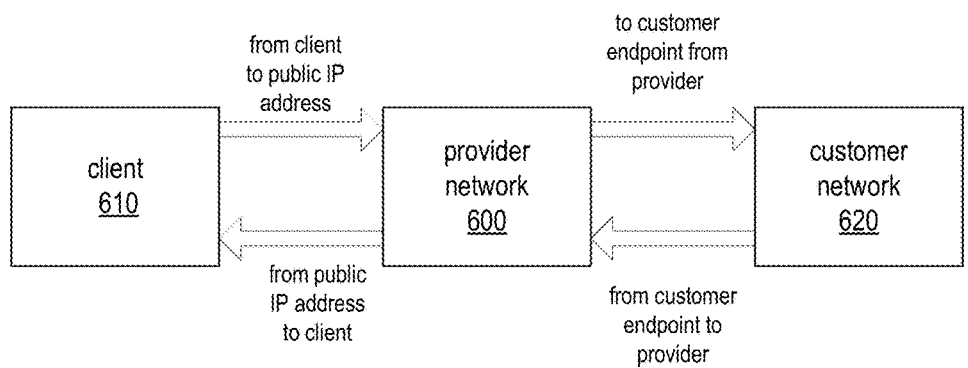
FIGS. 6A and 6B illustrate different techniques in which different entities handle routing response traffic from the customer network to the client according to various embodiments.
Figure 6B:
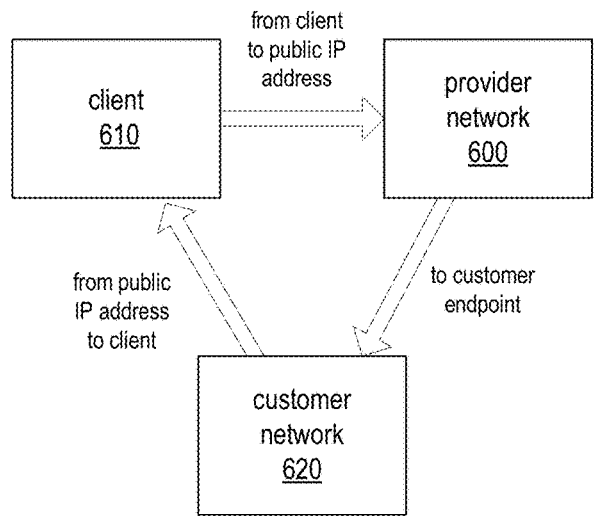

Various embodiments of traffic routing techniques are described that may be implemented to route client traffic sent to a customer IP address on a provider network to and from an endpoint in a customer's external network. The traffic routing techniques may, for example, differ with respect to which entity (the provider or the customer) handles routing response traffic to the client, and with respect to the communications technique employed between the provider network and the customer network. FIGS. 6A and 6B illustrate different techniques in which different entities handle routing response traffic from the customer network to the client according to various embodiments, and FIGS. 7A through 7D illustrate different techniques for communications between the provider network and the customer network according to various embodiments.

FIG. 6A illustrates a traffic routing technique in which the provider network handles routing response traffic to the client, according to some embodiments. A client 610 sends a packet (e.g., an IPv4 or IPv6 packet) to a public IP address assigned to the customer via the intermediate network. The packet from the client 610 indicates the client as the source address and the public IP address of the customer as the destination address. The provider network 600 recognizes that the public IP address has been remapped to a customer endpoint external to the provider network 600, applies a translation to the packet, and sends the translated packet to the endpoint on customer network 620 via a communications channel. The translated packet indicates an endpoint on the provider network 600 as the source address and the customer endpoint as the destination address. Return packet(s) from the customer endpoint are sent to the endpoint on the provider network 600 via the communications channel. The provider network 600 applies a "reverse" translation to the return packet(s) and sends the translated return packet(s) to the client 610 via the intermediate network. The translated return packet(s) indicate the client 610 as the destination address and the original public IP address as the source address. Thus, from the perspective of client 610, it appears as if the client 610 is communicating with the public IP address of the customer on the provider network 600. However, the client has actually communicated with the endpoint on customer network 620.

FIG. 6B illustrates a traffic routing technique in which the customer handles routing response traffic to the client, according to some embodiments. A client 610 sends a packet (e.g., an IPv4 or IPv6 packet) to a public IP address assigned to the customer via the intermediate network. The packet from the client 610 indicates the client as the source address and the public IP address of the customer as the destination address. The provider network 600 recognizes that the public IP address has been remapped to a customer endpoint external to the provider network 600, applies a translation to the packet, and sends the translated packet to the endpoint on customer network 620 via a communications channel. The translated packet may indicate an endpoint on the provider network 600 as the source address and the customer endpoint as the destination address. However, instead of sending return packets from the customer endpoint to the endpoint on the provider network 600, customer network 620 sends the return packet(s) to the client 610 via the intermediate network. The return packet(s) may indicate the client 610 as the destination address and the original public IP address as the source address. Thus, customer network 620 may implement a method for mapping from the source and destination addresses of the packets received from provider network 600 to the client 610 address and the public IP address of the original packets sent from client 610. As in the technique illustrated in FIG. 6A, from the perspective of client 610, it appears as if the client 610 is communicating with the public IP address of the customer. However, the client has actually communicated with the endpoint on customer network 620.

Figure 7A:
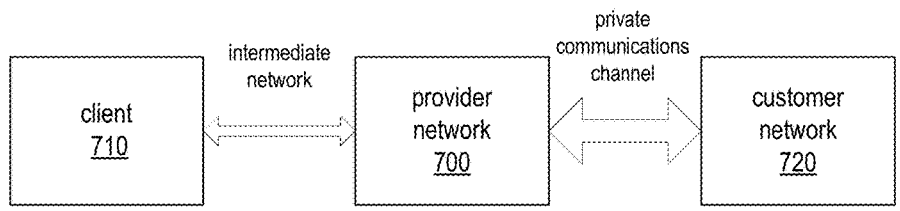
FIGS. 7A through 7D illustrate different techniques for communications between the virtualized service provider network and the customer network according to various embodiments.
Figure 7B:
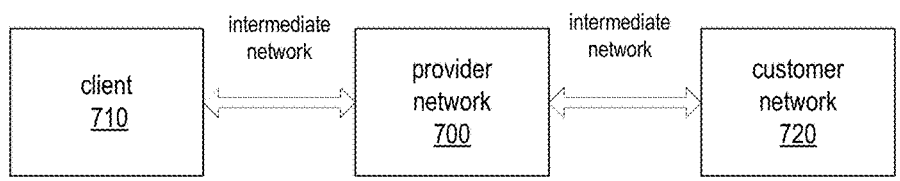

FIGS. 7A and 7B illustrate different techniques for communications between a provider network and a customer network in a traffic routing technique as illustrated in FIG. 6A, according to various embodiments. In FIG. 7A, the communications channel between the provider network 700 and the customer network 720 is a private communications channel. A private communications channel may be defined as a communications channel that carries only traffic between two entities. A private communications channel may be implemented according to a network tunneling technique, or by some other peering technique. In at least some embodiments, the tunneling protocol or technique may involve a tunneling technology in which packets are encapsulated according to a tunneling protocol; the encapsulated packets are passed through tunnels over an intermediate network (e.g., a public network such as the Internet). Example protocols or techniques that may be used in some embodiments for the private communications channel include, but are not limited to, GRE (Generic Routing Encapsulation), IP in IP, and IPsec (Internet Protocol Security). GRE is a tunneling protocol that encapsulates network layer protocol packets inside IP tunnels, creating a virtual point-to-point link to routers at remote points over an IP network. IP in IP is an IP tunneling protocol that encapsulates one IP packet in another IP packet; a header is added that indicates the entry point and the exit point of the tunnel. IPsec is a protocol suite for securing IP communications by authenticating and encrypting each IP packet. Alternatively, a private communications channel may be implemented over a direct, dedicated connection between a customer private network and a customer network. In embodiments in which the customer has a private network on the provider network 700, the private communications channel may be established between a gateway at the customer's private network and a gateway at the customer's external network or data center as illustrated in FIG. 4.

In FIG. 7B, the communications channel between the provider network 700 and the customer network 720 is over an intermediate network, such as the public Internet. In this case, a private communications channel is not used to send packets between the provider network 700 and the customer network 720. Instead, the packets are sent onto an intermediate network, for example the Internet, e.g. as standard IPv4 or IPv6 packets, and are routed by standard network routing to the destination address. Instead of encapsulating the packets received from the client 710 according to a tunneling protocol, the source and destination addresses of the packets may be modified so that the packets can be routed from the provider network 700 to the endpoint on the customer network 720.

Figure 7C:
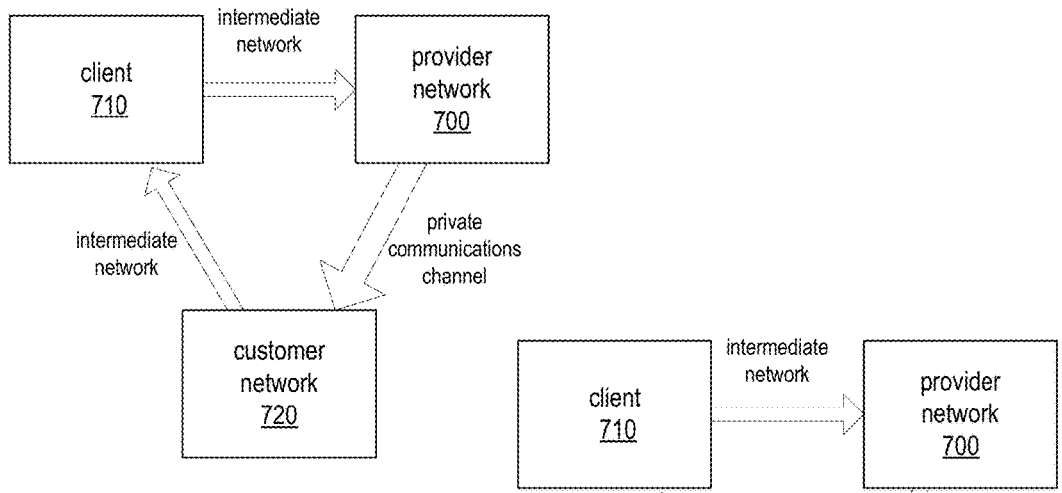
Figure 7D:
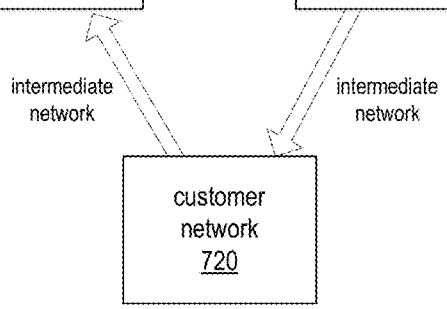

FIGS. 7C and 7D illustrate different techniques for communications between a provider network and a customer network in a traffic routing technique as illustrated in FIG. 6B, according to various embodiments. In FIG. 7C, traffic from the provider network 700 to the customer network 720 is over a private communications channel, as described in reference to FIG. 7A. Response traffic from the customer network 720 to the client 710, however, is over an intermediate network, which may be a public network such as the Internet or a shared network. In FIG. 7D, traffic from the provider network 700 to the customer network 720 is over the public network, as described in reference to FIG. 7B. Response traffic from the customer network 720 to the client 710 is also over the public network.

While FIGS. 7A through 7D show communications between the client 710 and the provider network 700 as over the public network, it is noted that this communications may be over some other communications channel, for example over a private communications channel. The private communications channel may be implemented over an intermediate network according to a tunneling technique or some other peering technique. Alternatively, a private communications channel 442 may be implemented over a direct, dedicated connection between a customer private network and customer network. In addition, while FIGS. 7C and 7D show communications between the customer network 720 and the client 710 as over the public network, it is noted that this communications may also be over some other communications channel, for example over a private communications channel.

Figure 9:
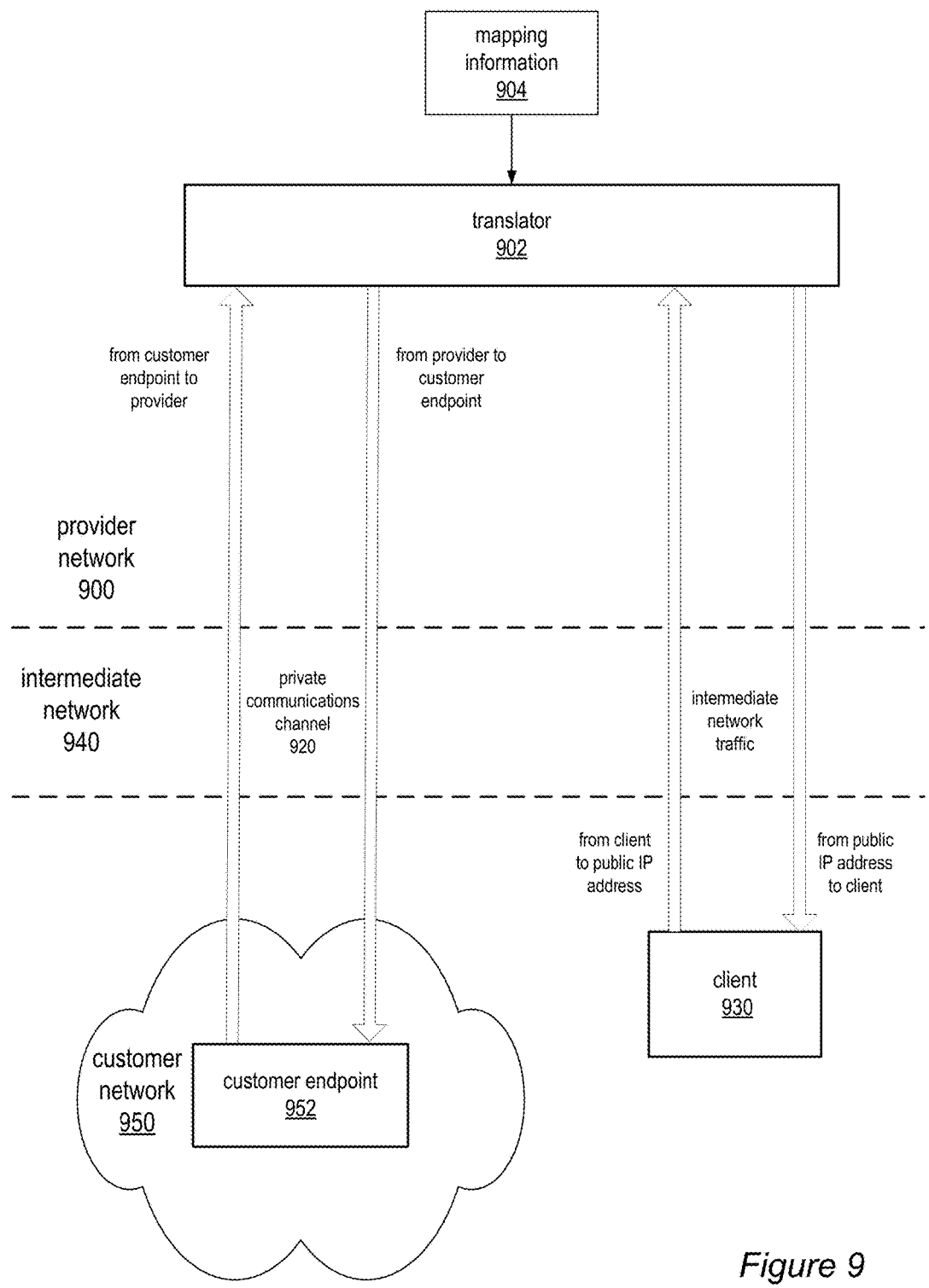
FIG. 9 illustrates remapping public IP addresses in a virtualized service provider network environment, according to some embodiments.
Figure 10:
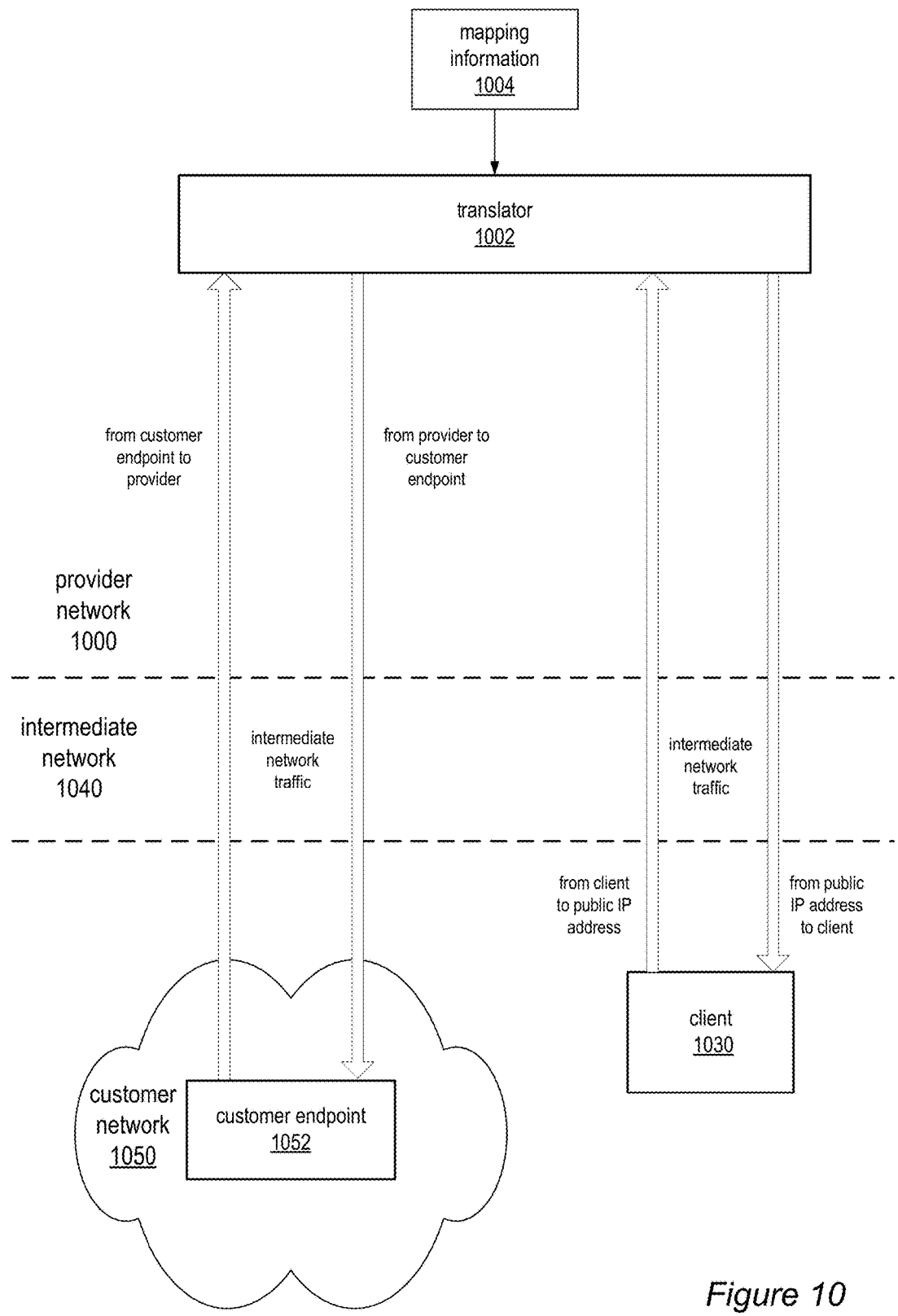
FIG. 10 illustrates remapping public IP addresses in a virtualized service provider network environment, according to some embodiments.

FIGS. 8 through 10 illustrate various embodiments of methods and apparatus for remapping public IP addresses in provider network environments, for example virtualized service provider network environments as illustrated in FIGS. 2 through 4. Note that, while FIGS. 8 through 10 show clients external to a provider network communicating with a public IP address of a customer of the provider network, a client may be an entity on the provider network. For example, one of the resource instances provided by a virtualized service provider may be a client that sends traffic to a public IP address of a customer that has been remapped to an endpoint on the customer's network.

FIG. 8 illustrates remapping public IP addresses in a provider network environment that provides private networks to customers, according to some embodiments. A customer private network 810 may be established on a provider network 800. The customer private network 810 may, for example, enable the customer to connect their existing infrastructure on customer network 850 to virtualized resource instances allocated to the customer via a private communications channel 822, for example a tunnel or other peering connection over intermediate network 840. Alternatively, a private communications channel 822 may be implemented over a direct, dedicated connection between customer private network 810 and customer network 850. The private communications channel 822 may, for example, be established between a gateway 820A at private network 810 and a gateway 820B at customer network 850.

Provider network 800 may include one or more network devices or appliances that implement instances of translators that provide network address translation (NAT) or similar functionality for appropriately routing packets on the provider network 800. In FIG. 8, these translator devices are shown as translators 802A and 802B. The translators 802 may, for example, perform mapping of addresses on provider network 800, for example mapping from destination public IP addresses for incoming IP traffic from intermediate network 840 to the private IP addresses of devices and resource instances on the provider network 800, and vice versa. To perform the mapping, translators 802 may access or obtain mapping information 804. In some embodiments, mapping information 804 may be maintained by and obtained from a mapping service 230, as shown in FIG. 2. At least one translator (e.g., translator 802A) may be assigned to translate traffic coming into and out of customer private network 810.

A range of public IP addresses may be allocated to the customer private network 810 as customer IP addresses. The customer may assign particular customer IP addresses to particular resource instances in private network 810. In addition, the customer may assign or remap particular customer IP addresses to endpoints on customer network 850, such as example customer endpoint 852. FIG. 5 shows an example user interface to an API that allows the customer to assign and remap customer IP addresses to resource instances or customer endpoints. The provider network 800 may maintain mapping information 804 that includes mappings of the customer IP addresses to respective customer endpoints, as well as mappings of customer IP addresses to respective private IP addresses of resource instances on the provider network 800 allocated to the customer.

Figure 11A:
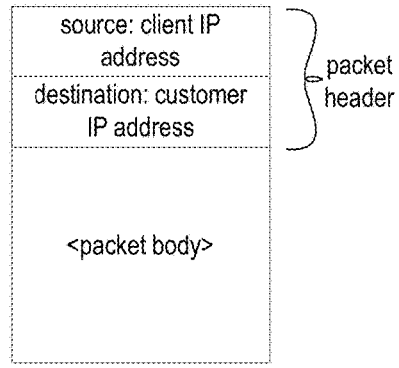
FIG. 11A illustrates an example IP packet received from a client and addressed to a public IP address of a virtualized service provider network, according to at least some embodiments.
Figure 12A:
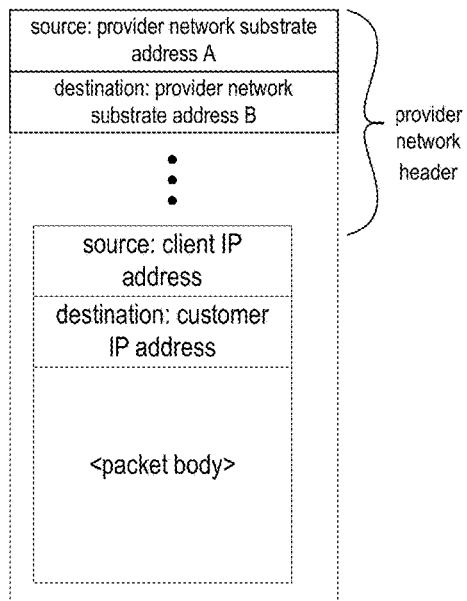
FIG. 12A illustrates an example encapsulated packet for transmission over a virtualized service provider network substrate, according to at least some embodiments.

Client 830 sends a packet (e.g., an IPv4 or IPv6 packet), via the intermediate network 840, to a public IP address assigned to the customer. FIG. 11A illustrates an example IP packet from client 830. The header of the IP packet from client 830 indicates the client address as the source address and a customer IP address assigned to the customer as the destination address. At provider network 800, a translator 802A may receive the packet, and may access mapping information 804 to determine that the customer IP address indicated by the packet has been remapped by the customer to a customer endpoint 852 on customer network 850, and thus external to the provider network 800. In at least some embodiments, translator 802A may encapsulate or otherwise encode the packet from the client 830 for transmission over customer private network 810, for example as an overlay network packet according to an IP tunneling protocol used on provider network 800 (see FIG. 2). The encoded packet may indicate a network substrate address of another translator 802B. An example packet for transmission over customer private network 810 is illustrated in FIG. 12A. Note that, while FIG. 12A shows the encoded packet as including the source client IP address and destination customer IP address, in some embodiments the packet header may be stripped from the packet from client 830 prior to encoding. Translator 802A may then send the encoded packet to translator 802B via the customer private network 810. Note that translator 802A and translator 802B may be different instances of a translator, or may be the same instance.

A path over the customer private network 810 via which the packet is routed may include one or more network appliances that may apply networking functions to packets that are routed through the network appliances. The network appliances may include one or more of, but are not limited to, firewalls, packet inspection appliances, security appliances, acceleration caches, and load balancers. Thus, a customer may have network appliances on the customer private network 810 that perform various functions on traffic passing through the customer private network 810 between client devices 830 and the customer's external network 850.

Figure 12B:
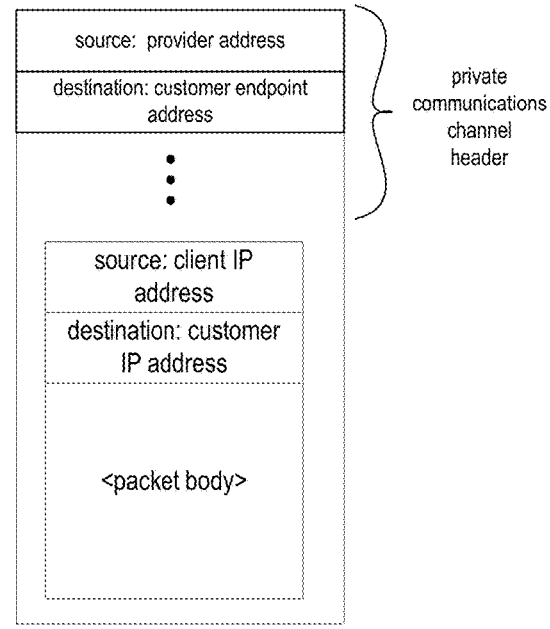
FIG. 12B illustrates an example packet encapsulated according to an encapsulation format or protocol for transmission on a private communications channel, according to at least some embodiments.

Upon receiving the overlay network packet, translator 802B may, if necessary, strip the provider network 800 encapsulation from the packet, apply a translation to the destination customer IP address of the packet from client 830 to determine the customer endpoint address to which the customer IP address is mapped, and encode the packet from client 830 for transmission on the private communications channel 820. In some embodiments, encoding the packet may involve encapsulating the packet from client 830 according to an encapsulation format or protocol of the private communications channel 820. However, other methods for encoding the packet may be used. Alternatively, gateway 820A may perform the encoding of the packet from client 830. FIG. 12B illustrates an example packet encoded according to a format or protocol that may be used on private communications channel 820. In at least some embodiments, in applying the translation to the destination customer IP address, translator 802B may access mapping information 804 to determine the particular customer endpoint address to which the destination customer IP address is mapped. In a header of the private communications channel packet, the source address may be set to indicate a virtualized service provider address, for example an address of translator 802B. The destination address in the header of the private communications channel packet may be set to indicate the customer endpoint 852 address. The encoded packet is then sent through intermediate network 840, via the private communications channel 820 between gateways 820A and 820B, to the customer network 850. Note that, while FIG. 8 shows translator 802B and gateway 820A as separate entities, in some embodiments translator 802B may be a component of gateway 820A.

At customer network 850, the packet may be received at gateway 820B via private communications channel 820 and routed to a customer endpoint 852 over customer network 850. The packet may indicate an endpoint on the provider 800 network as the source address and the customer endpoint 852 as the destination address. In some embodiments, gateway 820B may strip the private communications channel 820 encapsulation from the packet before routing the packet to customer endpoint 852 over customer network 850. In some embodiments, gateway 820B may encode the packet according to a network protocol used on customer network 850 before routing the packet over customer network 850, or may perform some other action on the packet related to a network protocol used on customer network 850.

After receiving the packet, customer endpoint 852 may perform some function or action in response to the packet that generates one or more response packets. A response packet may be encoded for transmission on the private communications channel 820. In some embodiments, a response packet may be encapsulated, for example by gateway 802B, according to a private communications channel 820 protocol. The encoded response packet may indicate the endpoint on the virtualized service provider 800 network as the destination address and the customer endpoint 852 as the source address. The encoded response packet is then sent through intermediate network 840, via the private communications channel 820 between gateways 820B and 820A, to the provider network 800. At provider network 800, the encoded response packet may be received at gateway 820A via private communications channel 820. The encoded response packet may be passed to translator 802B.

At translator 802B, in some embodiments, the private communications channel 820 encapsulation may be stripped from the response packet. In at least some embodiments, translator 802B may encode the response packet according to a network protocol of provider network 800 for transmission over customer private network 810, for example as an overlay network packet according to an IP tunneling protocol used on provider network 800 (see FIG. 2). The encoded response packet may indicate a destination network substrate address of translator 802A. Translator 802B may then send the encapsulated packet to translator 802A via the customer private network 810.

A path over the customer private network 810 via which the response packet is routed may include one or more network appliances that may apply networking functions to packets that are routed through the network appliances. The network appliances may include one or more of, but are not limited to, firewalls, packet inspection appliances, security appliances, acceleration caches, and load balancers. Thus, a customer may have network appliances on the customer private network 810 that perform various functions on traffic passing through the customer private network 810 between the customer's external network 850 and client devices 830.

Figure 11B:
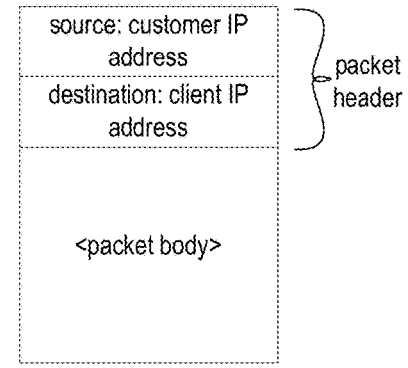
FIG. 11B illustrates an example response IP packet sent to a client and indicating a public IP address of a virtualized service provider network as the source, according to at least some embodiments.

At translator 802A, the provider network encapsulation, if any, may be stripped from the response packet, and an IP response packet may be formed that includes a packet body and a packet header that indicates the client address as the destination address and the customer IP address assigned to the customer as the source address. FIG. 11B illustrates an example IP response packet. In at least some embodiments, translator 802A may access mapping information 804 to translate address information from the encapsulated response packet received from translator 802B into the address information for the packet header of the IP response packet. The IP response packet is then sent to the client 830 via the intermediate network 840. From the perspective of client 830, it appears as if the client 830 is communicating with the public IP address of the customer on provider network 800. However, the client 830 has actually communicated with the endpoint 852 on customer network 850.

In the embodiment as illustrated in FIG. 8, response packets are sent from the customer network 850 to the provider network 800, which then handles routing of the response packets to client 830. This traffic routing technique is illustrated in FIG. 6A. However, in some implementations, the customer may instead handle the routing of the response traffic to client 830, as in the traffic routing technique illustrated in FIG. 6B. In these implementations, customer network 850 is responsible for mapping or translating from the source and destination addresses of the packets received from provider network 800 via private communications channel 820 to the client 830 address and the public IP address of the original packets sent from client 830 to provider network 800 so that the response packets sent from customer network 850 to client 830 indicate the client 830 as the destination address and the original public IP address as the source address.

In the embodiment as illustrated in FIG. 8, provider network packets are passed between translator 802A and translator 802B over the customer private network 810. The provider network packets may encode either packets sent from client 830 to a customer IP address that are being remapped to customer endpoint 852, or response packets from customer endpoint 852 that are being returned to client 830. The portion of the customer private network 810 through which these virtualized service provider network packets are routed may include one or more network appliances that are part of customer private network 810. These network appliances may be configured to apply various networking functions to customer private network 810 traffic. Thus, the various networking functions that may be applied to customer private network 810 traffic by these network appliances may be applied to the provider network packets passed between translator 802A and translator 802B as illustrated in FIG. 8. Examples of network appliances that implement network functions that may be applied to the packets passed between translator 802A and translator 802B include, but are not limited to, firewalls, virus checkers or other inspection appliances, appliances that implement security services, appliances that perform intrusion detection, acceleration caches, load balancers, and in general any networking function that may be performed on network traffic by a network device or appliance.

FIG. 9 illustrates remapping public IP addresses in a provider network environment, according to some embodiments. A range of public IP addresses may be allocated to a customer of the provider network 900 as customer IP addresses. The customer may assign particular customer IP addresses to particular resource instances on provider network 900. In addition, the customer may assign or remap particular customer IP addresses to endpoints on customer network 950, such as example customer endpoint 952. FIG. 5 shows an example user interface to an API that allows the customer to assign and remap customer IP addresses to resource instances or customer endpoints. The provider network 900 may maintain mapping information 904 that includes mappings of the customer IP addresses to respective customer endpoints, as well as mappings of customer IP addresses to respective private IP addresses of resource instances on provider network 900 allocated to the customer.

Client 930 sends a packet (e.g., an IPv4 or IPv6 packet), via the intermediate network 940, to a public IP address assigned to the customer. FIG. 11A illustrates an example IP packet from client 930. The header of the IP packet from client 930 indicates the client address as the source address and a customer IP address assigned to the customer as the destination address. At provider network 900, a translator 902 may receive the packet, and may access mapping information 904 to determine that the customer IP address indicated by the packet has been remapped by the customer to a customer endpoint 952 on customer network 950, and thus external to the provider network 900. Translator 902 may encode the packet from client 930 for transmission on the private communications channel 920. In some embodiments, encoding the packet may involve encapsulating the packet from client 930 according to a protocol for sending packets over the intermediate network 940 in a private communications channel 920 or tunnel. Example protocols that may be used in some embodiments for the private communications channel 920 include, but are not limited to, GRE (Generic Routing Encapsulation), IP in IP, and IPsec (Internet Protocol Security). However, other methods for encoding the packet may be used. In addition, a private communications channel 920 may be implemented over a direct, dedicated connection between a customer private network 910 and customer network 950. FIG. 12B illustrates an example packet encoded according to a format or protocol that may be used on private communications channel 920. In at least some embodiments, in applying the translation to the destination customer IP address, translator 902 may access mapping information 904 to determine the particular customer endpoint address to which the destination customer IP address is mapped. In a header of the private communications channel packet, the source address may be set to indicate a virtualized service provider address, for example an address of translator 902. The destination address in the header of the private communications channel packet may be set to indicate the customer endpoint 952 address. The encapsulated packet is then sent through intermediate network 940, via the private communications channel 920, to the customer network 950.

At customer network 950, the encoded packet may be received via private communications channel 920 and routed to a customer endpoint 952 over customer network 950. The encoded packet may indicate an endpoint on the virtualized service provider 900 network as the source address and the customer endpoint 952 as the destination address. In some embodiments, the private communications channel 920 encapsulation may be stripped from the packet before routing the packet to customer endpoint 952 over customer network 950. In some embodiments, the packet may be encoded according to a network protocol used on customer network 950 before routing the packet over customer network 950.

After receiving the packet, customer endpoint 952 may perform some function or action in response to the packet that generates one or more response packets. A response packet may be encoded for transmission on the private communications channel 920. In some embodiments, a response packet may be encapsulated according to the private communications channel 920 protocol. The encoded response packet may indicate the endpoint on the virtualized service provider 900 network as the destination address and the customer endpoint 952 as the source address. The encoded response packet may then be sent through intermediate network 940, via a private communications channel 920, to the provider network 900. Alternatively, a private communications channel 920 may be implemented over a direct, dedicated connection between customer private network 910 and customer network 950. At provider network 900, the encoded response packet may be routed to or received at translator 902.

At translator 902, in some embodiments, the private communications channel 920 encapsulation may be stripped from the response packet, and an IP response packet may be formed that includes a packet body and a packet header that indicates the client address as the destination address and the customer IP address assigned to the customer as the source address. FIG. 11B illustrates an example IP response packet. In at least some embodiments, translator 902 may access mapping information 904 to translate address information from the encapsulated response packet received from customer network 950 into the address information for the packet header of the IP response packet. The IP response packet is then sent to the client 930 via the intermediate network 940. From the perspective of client 930, it appears as if the client 930 is communicating with the public IP address of the customer on provider network 900. However, the client 930 has actually communicated with the endpoint 952 on customer network 950.

In the embodiment as illustrated in FIG. 9, response packets are sent from the customer network 950 to the provider network 900, which then handles routing of the response packets to client 930. This traffic routing technique is illustrated in FIG. 6A. However, in some implementations, the customer may instead handle the routing of the response traffic to client 930, as in the traffic routing technique illustrated in FIG. 6B. In these implementations, customer network 950 is responsible for mapping or translating from the source and destination addresses of the packets received from provider network 900 via private communications channel 920 to the client 930 address and the public IP address of the original packets sent from client 930 to provider network 900 so that the response packets sent from customer network 950 to client 930 indicate the client 930 as the destination address and the original public IP address as the source address.

FIG. 10 illustrates remapping public IP addresses in a provider network environment, according to some embodiments. In these embodiments, rather than sending traffic between the provider network 1000 and the customer endpoint 1052 on customer network 1050 via a private communications channel as illustrated in FIGS. 8 and 9, the packets received by customer network 1050 from the client 1030 that are addressed to the customer IP address are modified and sent over the intermediate network 1040 to the customer endpoint 1052.

A range of public IP addresses may be allocated to a customer of the provider network 1000 as customer IP addresses. The customer may assign particular customer IP addresses to particular resource instances on provider network 1000. In addition, the customer may assign or remap particular customer IP addresses to endpoints on customer network 1050, such as example customer endpoint 1052. FIG. 5 shows an example user interface to an API that allows the customer to assign and remap customer IP addresses to resource instances or customer endpoints. The provider network 1000 may maintain mapping information 1004 that includes mappings of the customer IP addresses to respective customer endpoints, as well as mappings of customer IP addresses to respective private IP addresses of resource instances on provider network 1000 allocated to the customer.

Client 1030 sends a packet (e.g., an IPv4 or IPv6 packet), via the intermediate network 1040, to a public IP address assigned to the customer. FIG. 11A illustrates an example IP packet received from client 1030. The header of the IP packet from client 1030 indicates the client address as the source address and a customer IP address assigned to the customer as the destination address. At provider network 1000, a translator 1002 may receive the packet, and may access mapping information 1004 to determine that the customer IP address indicated by the packet has been remapped by the customer to a customer endpoint 1052 on customer network 1050, and thus external to the provider network 1000. Translator 1002 may then translate the customer IP address to the particular customer endpoint address. In at least some embodiments, in translating the customer IP address, translator 1002 may access mapping information 1004 to determine the particular customer endpoint address to which the destination customer IP address is mapped.

In at least some embodiments, translator 1002 may replace the destination address in the IP packet (e.g., an IPv4 or IPv6 packet) received from client 1030 (the customer IP address) with the customer endpoint address to which the customer IP address has been mapped. In some embodiments, translator 1002 may also replace the source address in the IP packet received from client 1030 (the client IP address) with a provider network address (e.g., a public IP address assigned to translator 1002). The IP packet is then sent through intermediate network 1040 to the customer network 1050.

Figure 13A:
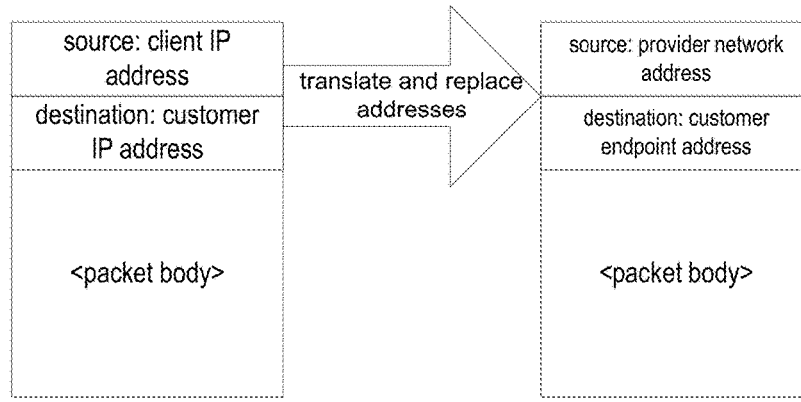
FIG. 13A illustrates translating and replacing the source and destination addresses in an IP packet, according to at least some embodiments.
Figure 13B:
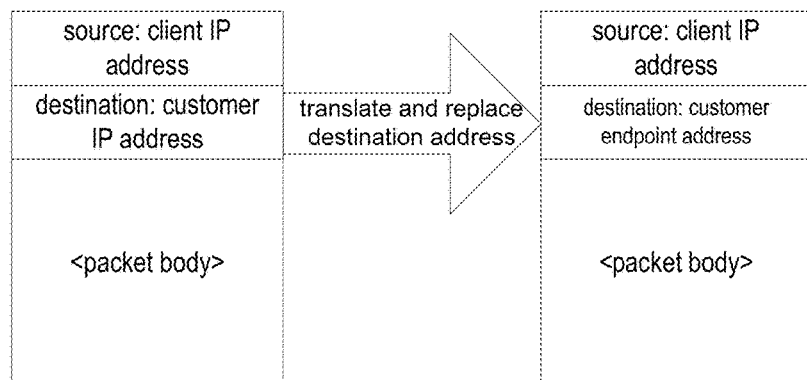
FIG. 13B illustrates translating and replacing only the destination address in an IP packet, according to at least some embodiments.

FIGS. 13A and 13B both illustrate translating and replacing the destination address in an IP packet, according to at least some embodiments. In FIG. 13A, the source address in the IP packet received from client 1030 is also replaced with a provider network address. In FIG. 13B, however, the source address is not replaced or changed. Replacing both the source and destination addresses, as shown in FIG. 13A, may be used in implementations where the customer network 1050 routes response traffic back to the provider network 1000, as illustrated in FIG. 6A. Replacing only the destination address, as shown in FIG. 13B, may be used in implementations where the customer network 1050 routes response traffic directly to the client 1030 over intermediate network 1040, as illustrated in FIG. 6B.

Figure 14:
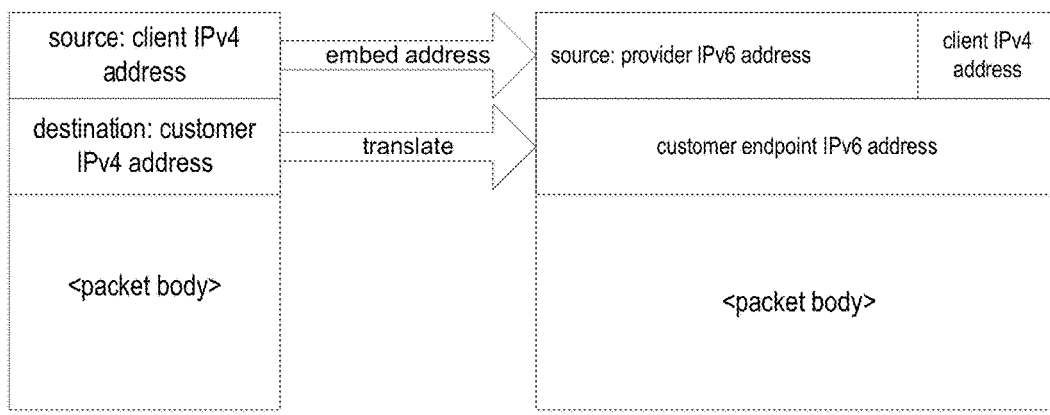
FIG. 14 illustrates converting an IPv4 packet to an IPv6 packet, according to at least some embodiments.

In some embodiments, instead of replacing one or more of the addresses in the IP packet, translator 1002 may instead convert the packet from one IP packet format to another, as illustrated in FIG. 14. For example, the packet received from the client 1030 may be an IPv4 packet. Translator 1002 may form an IPv6 packet, and embed the IPv4 source address from the original IP packet in the IPv6 source address. IPv4 addresses are 32 bit addresses, while IPv6 addresses are 128 bit addresses so the source address (the client IP address) may be embedded as 32 bits of the 128-bit IPv6 packet header source address. The destination address in the header of the IPv6 packet may be set to indicate the customer endpoint 1052 IPv6 address. The IPv6 packet is then sent through intermediate network 1040 to the customer network 1050.

At customer network 1050, the IP packet may be received and routed to customer endpoint 1052 over customer network 1050. The IP packet the customer endpoint 1052 as the destination address. As noted above, in some embodiments, the IP packet may also indicate an endpoint on the provider network 1000 as the source address; however, in other embodiments, the IP packet may indicate the client 1030 as the source address. In some embodiments, the packet may be encoded according to a network protocol used on customer network 1050 before routing the packet over customer network 1050.

After receiving the IP packet (e.g., and IPv4 or IPv6 packet), customer endpoint 1052 may perform some function or action in response to the IP packet that generates one or more response packets. A response IP packet may be formed according to the IP protocol (IPv4 or IPv6). In some implementations, the response IP packet may indicate an endpoint on the provider network 1000 as the destination address and the customer endpoint 1052 as the source address. The response IP packet is then sent through intermediate network 1040 to the provider network 1000. At provider network 1000, the response packet may be routed to or received at translator 1002.

At translator 1002, the source and addresses from the response IP packet received from the customer network 1050 may be translated according to mapping information 1004 to obtain the client address as the destination address and the customer IP address as the source address. The source and destination addresses in the response IP packet may be changed, or a new IP packet may be formed, so that the IP packet header indicates the client address as the destination address and the customer IP address assigned to the customer as the source address. The response IP packet is then sent to the client 1030 via the intermediate network 1040. FIG. 11B illustrates an example response IP packet that may be sent to the client 1030. From the perspective of client 1030, it appears as if the client 1030 is communicating with the public IP address of the customer on provider network 1000. However, the client 1030 has actually communicated with the endpoint 1052 on customer network 1050.

In the embodiment as illustrated in FIG. 10, response IP packets are sent from the customer network 1050 to the provider network 1000, which then handles routing of the response IP packets to client 1030. This traffic routing technique is illustrated in FIG. 6A. However, in some implementations, the customer may instead handle the routing of the response traffic to client 1030, as in the traffic routing technique illustrated in FIG. 6B. In these implementations, customer network 1050 is responsible for mapping or translating from the source and destination addresses of the IP packets received from provider network 1000 to the client 1030 address and the public IP address of the original IP packets sent from client 1030 to provider network 1000 so that the response IP packets sent from customer network 1050 to client 1030 indicate the client 1030 as the destination address and the original public IP address as the source address. Note, however, that in implementations where only the destination address of the IP packet from the client 1030 is changed by the provider network 1000, customer network 1050 may only have to translate the destination address in the IP packet received from provider network 1000 to determine the original public IP address as the source address, as the source address in the IP packet is the client address.

In some embodiments, a provider network such as provider networks 800, 900, and 1000 illustrated in FIGS. 8 through 10 may be a virtualized service provider network that provides virtualized resource instances on the network to the customers of the virtualized service provider network. The virtualized resource instances may include, for example, virtualized computation resources and virtualized storage resources. The virtualized service provider network may assign subsets of the plurality of resource instances to the customers as customer resource instances. In some embodiments, as illustrated in FIGS. 4 and 8, a virtualized service provider network may include at least one customer private network, each customer private network including a subset of resource instances assigned to a respective customer.

Figure 15A:
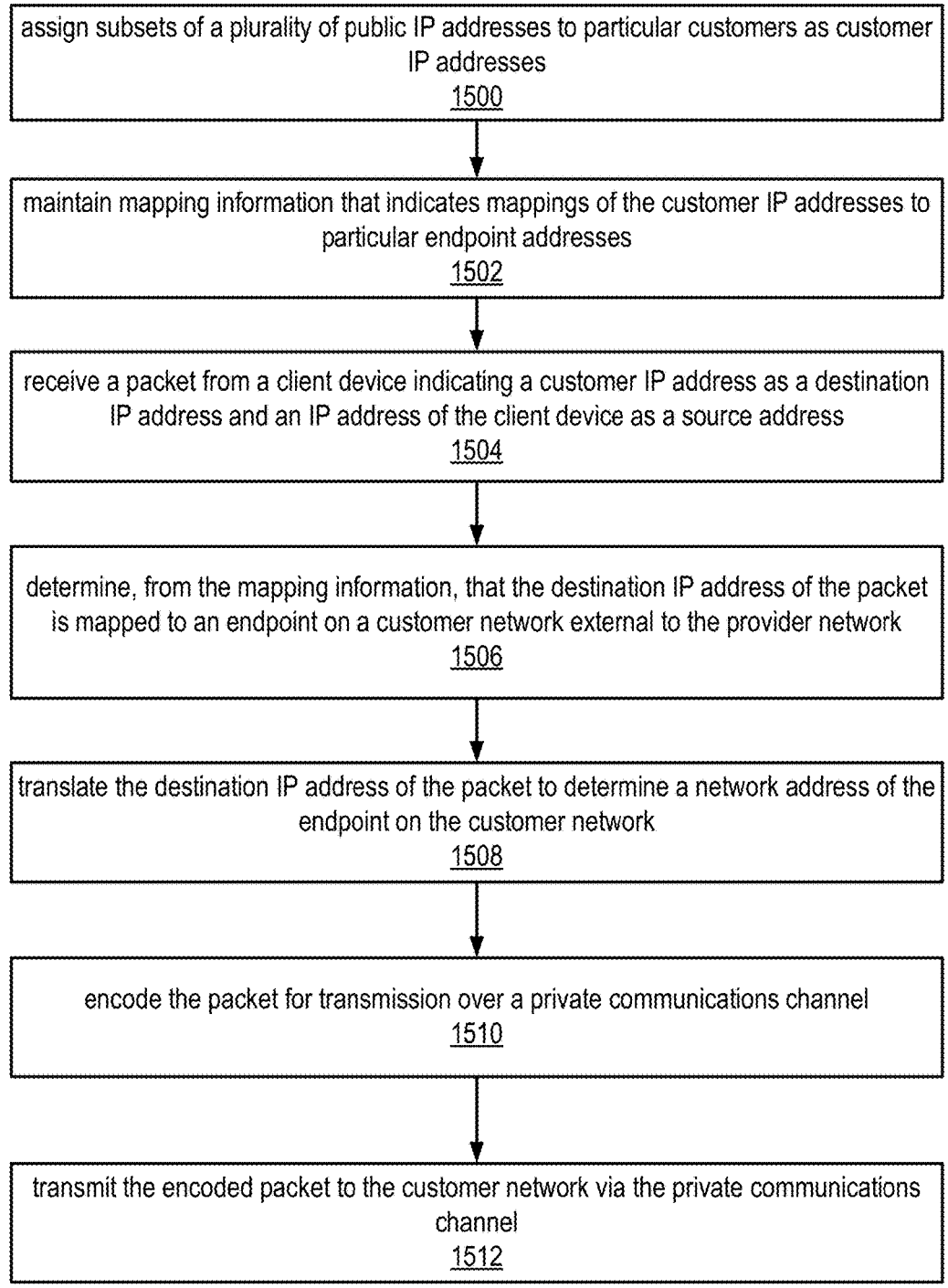
FIG. 15A is a flowchart of a method for remapping a customer IP address to an endpoint on a customer network and for routing packets addressed to the customer IP address to the endpoint via a private communications channel over an intermediate network, according to at least some embodiments.

FIG. 15A is a flowchart of a method for remapping a customer IP address to an endpoint on a customer network and for routing packets addressed to the customer IP address to the endpoint via a private communications channel, according to at least some embodiments. The private communications channel may be a tunnel or other peering connection over an intermediate network, which may be a shared network or a public network such as the Internet. Alternatively, the private communications channel may be implemented over a direct, dedicated connection between a provider network and a customer network. A provider network may assign subsets of a plurality of public Internet Protocol (IP) address to particular customers of the provider network as customer IP addresses, as indicated at 1500. The provider network may maintain mapping information that indicates mappings of the customer IP addresses to particular endpoint addresses, as indicated at 1502. The mappings may be specified by the customers of the provider network.

As indicated at 1504, a packet may be received on the provider network from a client device. The packet may, for example, be an IPv4 or IPv6 packet. The packet may indicate a customer IP address as a destination address and an IP address of the client device as a source address. The provider network may determine, from the mapping information, that the destination address of the packet is mapped to an endpoint on a customer network external to the provider network, as indicated at 1506. The provider network may translate the destination address of the packet to determine a network address of the endpoint on the customer network, as indicated at 1508. The provider network may encode the packet for transmission over a private communications channel, as indicated at 1510. In some embodiments, the packet may be encapsulated according to a private communications channel protocol to generate an encapsulated packet indicating the network address of the endpoint on the customer network as a destination address. The encoded packet may also indicate a network address of a network device on the provider network as a source address. The provider network may then send the encoded packet to the customer network via a private communications channel, as indicated at 1512. The private communications channel may be a tunnel implemented according to a network tunneling technology or some other peering connection over an intermediate network. The intermediate network may, for example, be a shared network or a public network such as the Internet. Alternatively, the private communications channel may be implemented over a direct, dedicated connection between the provider network and the customer network.

In some embodiments, a first network device of the provider network receives the packet from the client device, determines that the destination address of the packet is mapped to an endpoint on a customer network external to the provider network, and sends the packet to a second network device of the provider network over a customer private network on the provider network. In some embodiments, the first network device encodes the packet according to a network protocol of the provider network to form a provider network packet and sends the provider network packet to the second network device over the network substrate of the provider network. The second network device then translates the destination address of the packet, encodes the packet for transmission over the private communications channel, and sends the encoded packet to the customer network via the private communications channel. In some embodiments, a path over the customer private network via which the packet is sent from the first network device to the second network device may include one or more network appliances that may apply one or more networking functions, for example firewalls, packet inspection appliances, security appliances, acceleration caches, and load balancers, to packets passing through the network appliances.

In some embodiments, the provider network may be a virtualized service provider network that provides virtualized resource instances on the network to the customers of the virtualized service provider network. The virtualized resource instances may include, for example, virtualized computation resources and virtualized storage resources. The virtualized service provider network may assign subsets of the plurality of resource instances to the customers as customer resource instances. In some embodiments, as illustrated in FIGS. 4 and 8, a virtualized service provider network may include at least one customer private network, each customer private network including a subset of resource instances assigned to a respective customer.

In at least some embodiments, the virtualized service provider network may implement at least one virtualization service and at least one API to the virtualization service(s). A customer may access the at least one API from a device on the customer network to, for example, obtain a subset of the plurality of public IP addresses as customer IP addresses, obtain a subset of the plurality of resource instances on the provider network as customer resource instances, map the customer IP addresses obtained by the customer to particular customer resource instance obtained by the customer, and remap the customer IP addresses obtained by the customer to particular endpoints on the customer network.

Figure 15B:
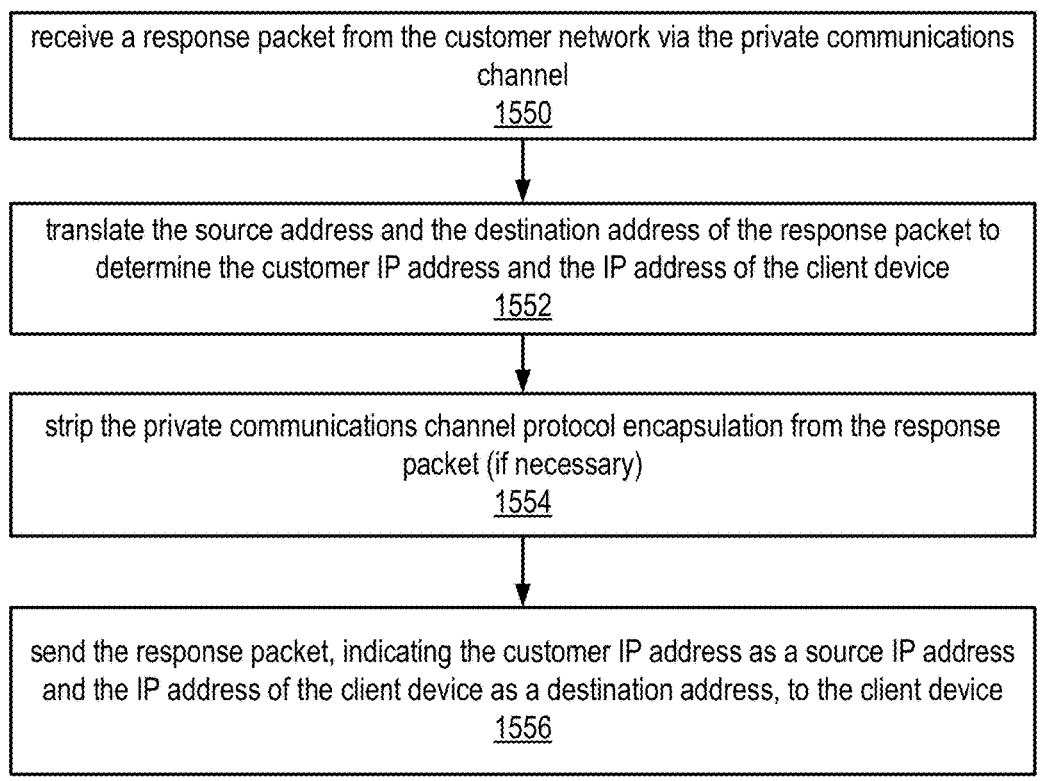
FIG. 15B is a flowchart of a method for routing response packets received from an endpoint on the customer network via a private communications channel to the client, according to at least some embodiments.

FIG. 15B is a flowchart of a method for routing response packets received from an endpoint on the customer network via a private communications channel to the client, according to at least some embodiments. The provider network may receive a response packet from the customer network via the private communications channel, as indicated at 1550. In some embodiments, the response packet may be encapsulated or otherwise encoded according to a private communications channel protocol. The response packet may indicate the network address of the endpoint on the customer network as a source address and the network address of a network device on the provider network as a destination address. The provider network may translate the source address and the destination address of the response packet to determine the customer IP address and the IP address of the client device, as indicated at 1552. In some embodiments, the provider network may strip the private communications channel protocol encapsulation from the response packet, as indicated at 1554. The provider network may then send the response packet, which indicates the customer IP address as a source IP address and the IP address of the client device as a destination address, to the client device as indicated at 1556.

Figure 16A:
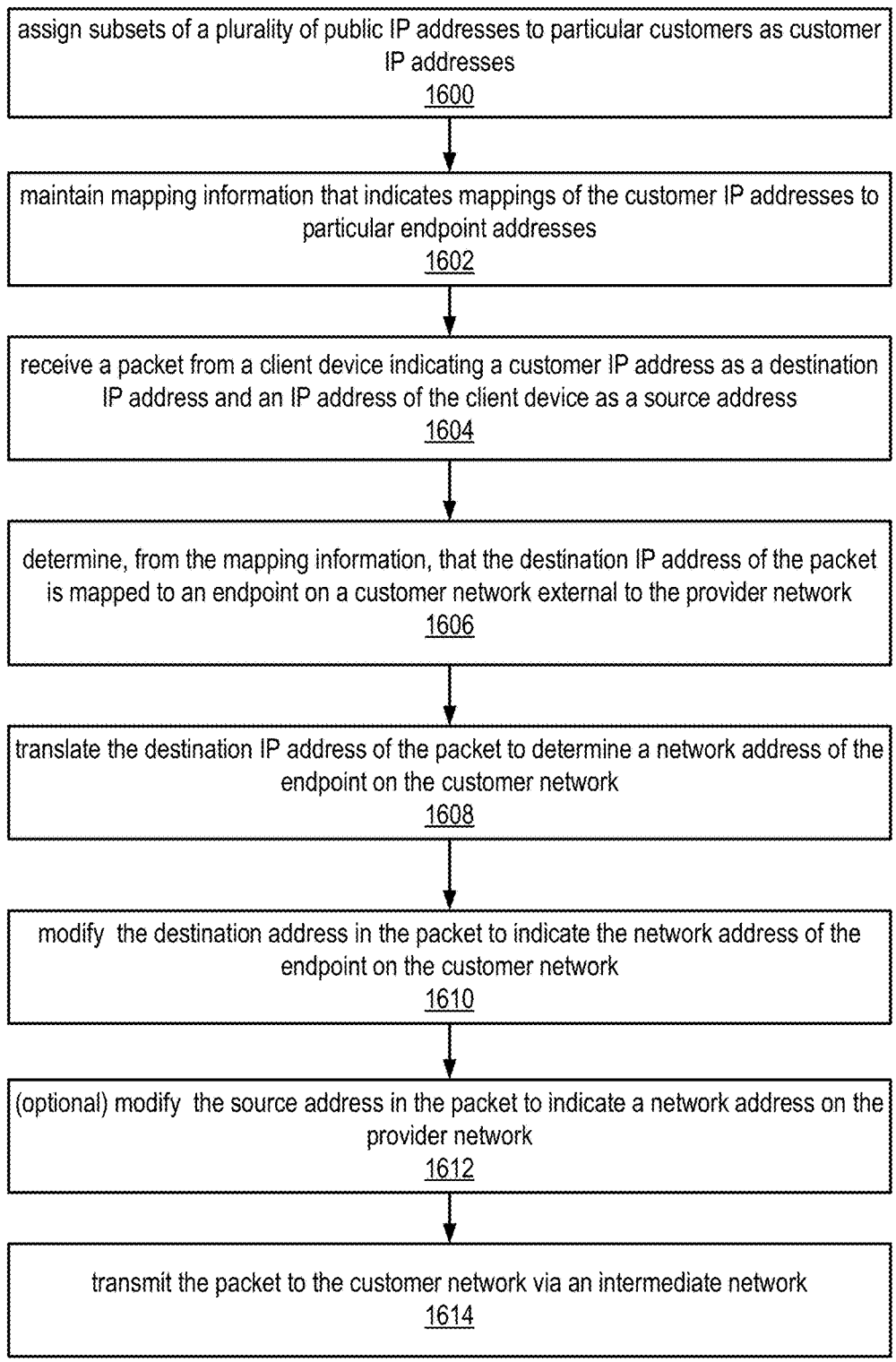
FIG. 16A is a flowchart of a method for remapping a customer IP address to an endpoint on a customer network and for routing packets addressed to the customer IP address to the endpoint over an intermediate network, according to at least some embodiments.

FIG. 16A is a flowchart of a method for remapping a customer IP address to an endpoint on a customer network and for routing packets addressed to the customer IP address to the endpoint over an intermediate network such as the public Internet, according to at least some embodiments. A provider network may assign subsets of a plurality of public Internet Protocol (IP) address to particular customers of the provider network as customer IP addresses, as indicated at 1600. The provider network may maintain mapping information that indicates mappings of the customer IP addresses to particular endpoint addresses, as indicated at 1602. The mappings may be specified by the customers of the provider network.

As indicated at 1604, a packet may be received on the provider network from a client device. The packet may, for example, be an IPv4 or IPv6 packet. The packet may indicate a customer IP address as a destination address and an IP address of the client device as a source address. The provider network may determine, from the mapping information, that the destination address of the packet is mapped to an endpoint on a customer network external to the provider network, as indicated at 1606. The provider network may translate the destination address of the packet to determine a network address of the endpoint on the customer network, as indicated at 1608. The provider network may then modify the destination address in the packet to indicate the network address of the endpoint on the customer network, as indicated at 1610. Optionally, the provider network may also change the source address in the packet to indicate a network address on the provider network, as indicated at 1612. FIGS. 13A and 13B and FIG. 14 illustrate different methods for modifying the destination and/or source addresses of the packet that may be used in various embodiments. The provider network may then transmit the packet to the customer network via an intermediate network, as indicated at 1612. The intermediate network may, for example, be a shared network or a public network such as the Internet.

In some embodiments, the provider network is a virtualized service provider network that provides virtualized resource instances on the network to the customers of the virtualized service provider network. The virtualized resource instances may include, for example, virtualized computation resources and virtualized storage resources. The virtualized service provider network may assign subsets of the plurality of resource instances to the customers as customer resource instances. In some embodiments, as illustrated in FIGS. 4 and 8, a virtualized service provider network may include at least one customer private network, each customer private network including the subset of resource instances assigned to a respective customer.

In at least some embodiments, the virtualized service provider network may implement at least one virtualization service and at least one API to the virtualization service(s). A customer may access the at least one API from a device on the customer network to, for example, obtain a subset of the plurality of public IP addresses as customer IP addresses, obtain a subset of the plurality of resource instances on the provider network as customer resource instances, map the customer IP addresses obtained by the customer to particular customer resource instance obtained by the customer, and remap the customer IP addresses obtained by the customer to particular endpoints on the customer network.

Figure 16B:
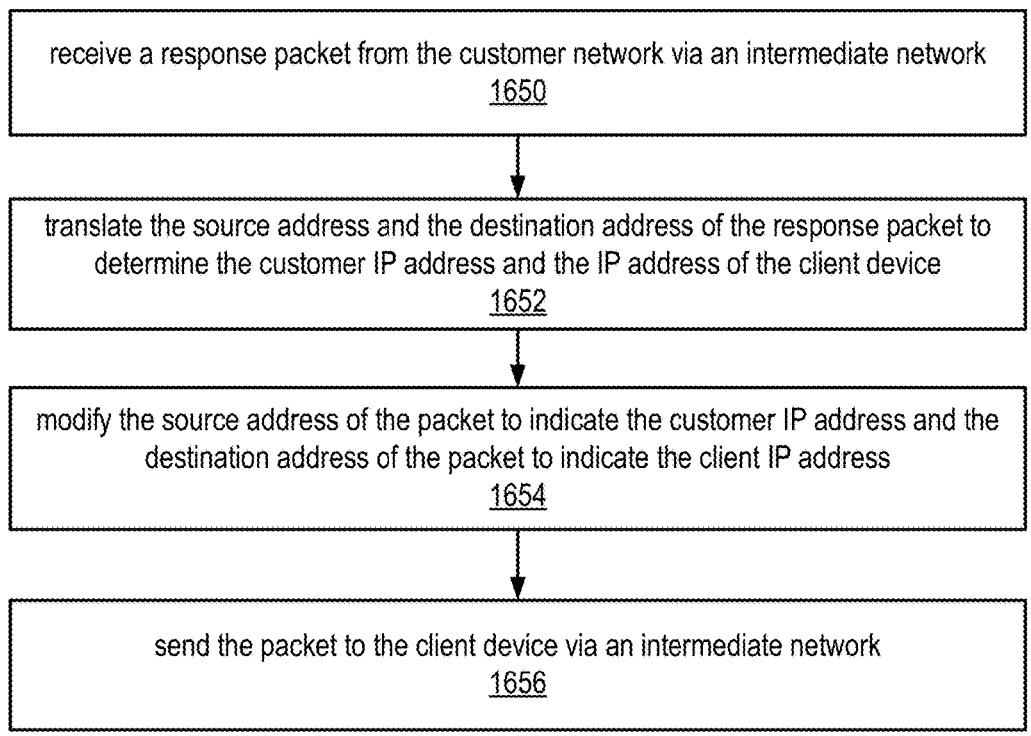
FIG. 16B is a flowchart of a method for routing response packets received from an endpoint on the customer network via an intermediate network to the client, according to at least some embodiments.

FIG. 16B is a flowchart of a method for routing response packets received from an endpoint on the customer network via an intermediate network, for example a shared network or a public network, to a client, according to at least some embodiments. The provider network may receive a response packet, for example an IPv4 or IPv6 packet, from the customer network via an intermediate network such as a shared network or a public network, as indicated at 1650. The response packet may indicate the network address of the endpoint on the customer network as a source address and the network address of a network device on the provider network as a destination address. The provider network may translate the source address and the destination address of the encapsulated response packet to determine the customer IP address and the IP address of the client device, as indicated at 1652. The provider network may then modify the source address of the packet to indicate the customer IP address and the destination address of the packet to indicate the client IP address, as indicated at 1654. The provider network may then send the response packet, which indicates the customer IP address as a source IP address and the IP address of the client device as a destination address, to the client device as indicated at 1656.

Example Use Cases

This section describes several example use cases or applications for embodiments of the methods and apparatus for remapping IP addresses.

Failures and Disaster Recovery

A customer may wish to use the virtualization services provided by a virtualized service provider as a backup for the customer's systems at the customer's data center. The customer may obtain resource instances and public IP addresses from the virtualized service provider. The customer may also set up a private network on the virtualized service provider network, for example as illustrated in FIGS. 4 and 8, and configure the private network as a backup for the customer network at the customer's data center. Using an embodiment of the methods and apparatus for remapping IP addresses, the customer may remap the public IP addresses obtained from the virtualized service provider network to endpoints on the customer network. Thus, during normal operations, traffic from the customer's clients is routed to the customer endpoints on the customer network. If a portion or all of the customer's network fails for some reason, the customer may, via a user interface to an API as illustrated in FIG. 5, quickly and easily remap the public IP addresses to resource instances on the customer's private network. Within seconds or minutes, the virtualized service provider network is routing traffic from the customer's clients to the virtualized service provider resource instances on the customer's private network.

Migration

A customer may wish to replace a portion or all of a system or application implemented at the customer's data center with an implementation at the virtualized service provider network. The customer may obtain resource instances and public IP addresses from the virtualized service provider. The customer may also set up a private network on the virtualized service provider network, for example as illustrated in FIGS. 4 and 8, and configure the private network as a replacement for a portion or all of system or application at the customer's data center. Using an embodiment of the methods and apparatus for remapping IP addresses, the customer may initially remap the public IP addresses obtained from the virtualized service provider network to endpoints on the customer network. The customer may then, over time, remap public IP addresses to the customer's resource instances on the virtualized service provider network. The customer may remap the public IP addresses to the resource instances one at a time rather than all at one time, thus allowing the customer to incrementally test the configuration before committing to the entire migration.

IPv4 Address Space Acquisition.

As a 32-bit address scheme, IPv4 address space is a limited resource. A virtualized service provider may obtain a relatively large allocation of IPv4 address space for allocation as public IP addresses to customers. To obtain IPv4 address space for a customer network, the customer may obtain a range of IPv4 addresses from the virtualized service provider and remap the IPv4 addresses to endpoints on the customer network. Note that, in this example, the customer may, but does not necessarily, also obtain resource instances from the virtualized service provider.

Network Traffic Processing

A customer may wish to use the services provided by a virtualized service provider to process network traffic to and from the customer's systems at the customer's data center. The customer may obtain resource instances and public IP addresses from the virtualized service provider. The customer may also set up a private network on the virtualized service provider network. The customer may remap at least some the public IP addresses obtained from the virtualized service provider network to endpoints on the customer network. The portion of the virtualized service provider network substrate through which network traffic to these endpoints is routed may include one or more network devices or appliances that are allocated to the customer's private network. These network devices may be configured to perform various networking functions on the customer's traffic. Examples of networking tasks that may be applied to the traffic on the private network include, but are not limited to, firewalls, virus checkers or other inspection devices, security services, intrusion detection systems, acceleration caches, load balancers, and in general any networking function that may be performed on network traffic by a network device or appliance.

Illustrative System

Figure 17:
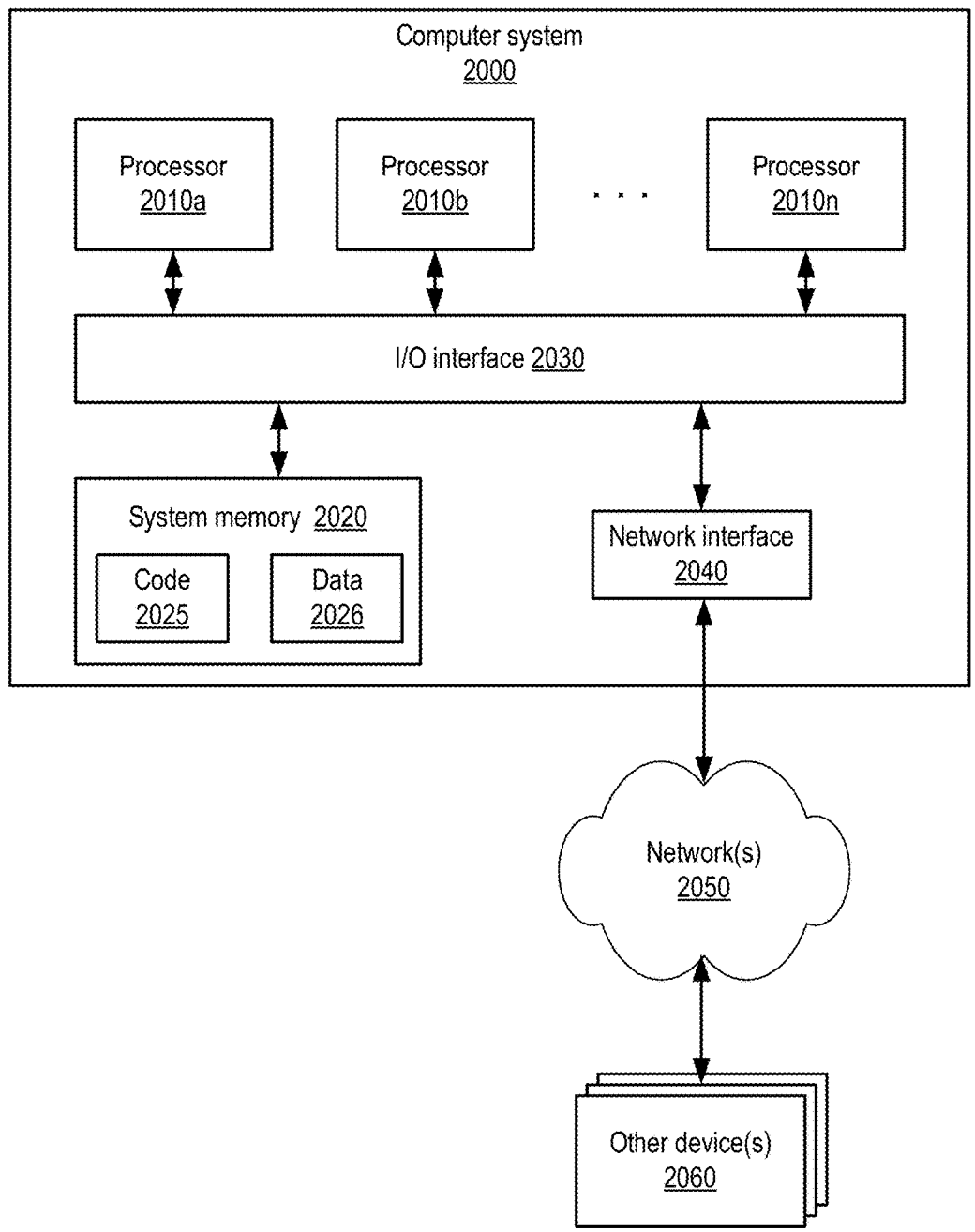
FIG. 17 is a block diagram illustrating an example computer system that may be used in some embodiments.

In at least some embodiments, a server that implements a portion or all of one or more of the technologies, including but not limited to the various virtualized service provider methods and apparatus and the methods and apparatus for remapping public IP addresses as described herein, may include a general-purpose computer system that includes or is configured to access one or more computer-accessible media, such as computer system 2000 illustrated in FIG. 17. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for virtualized service provider methods and apparatus and the methods and apparatus for remapping public IP addresses, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 2 through 4F, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 2 through 6 for implementing embodiments of virtualized service provider methods and apparatus and the methods and apparatus for remapping public IP addresses. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A provider network, comprising:
one or more server devices configured to:
assign subsets of a plurality of public Internet Protocol (IP) addresses to particular customers of the provider network as customer IP addresses, wherein the customer IP addresses are published external to the provider network and external to a customer network of the particular customers as addresses associated with one or more network devices on the provider network; and
maintain mapping information that indicates mappings of the customer IP addresses to particular endpoints, wherein the mappings are specified by the particular customers of the provider network, and wherein at least one customer IP address is currently mapped to an endpoint on the provider network and at least one other customer IP address is currently mapped to an endpoint external to the provider network;

the one or more network devices on the provider network configured to:
receive packets from client devices external to the provider network and external to the customer network, the packets indicating respective ones of the customer IP addresses as respective destination addresses and IP addresses of respective ones of the client devices as respective source addresses;
for at least some of the packets, determine, from the mapping information, whether a given customer IP address indicated by a given destination address of a given packet is currently mapped to a given endpoint on the provider network or is currently mapped to a given endpoint on the customer network external to the provider network;
based on the determination:
for a packet for which the customer IP address is currently mapped to a particular endpoint on the provider network, send the packet to the particular endpoint via the provider network; and
for another packet for which the customer IP address is currently mapped to a particular endpoint on the customer network external to the provider network:
translate the destination address of the other packet to determine a network address of the particular endpoint on the customer network;
encapsulate the other packet according to a private communications channel protocol to generate an encapsulated packet, wherein the encapsulated packet indicates the network address of the particular endpoint on the customer network as a destination address; and
send the encapsulated packet to the customer network via a private communications channel over a public network.

2. The provider network as recited in claim 1, wherein the public network is the Internet.

3. The provider network as recited in claim 1, wherein the encapsulated packet further indicates a network address of one of the one or more network devices on the provider network as a source address.

4. The provider network as recited in claim 3, wherein the one or more network devices are further configured to:
receive a response packet encapsulated according to the private communications channel protocol from the customer network via the private communications channel, wherein the encapsulated response packet indicates the network address of the particular endpoint on the customer network as a source address and the network address of one of the one or more network devices on the provider network as a destination address;
translate the source address and the destination address of the encapsulated response packet to determine the customer IP address and the IP address of the client device;
strip the private communications channel protocol encapsulation from the response packet; and
send the response packet to the client device, wherein the response packet sent to the client device indicates the customer IP address as a source IP address and the IP address of the client device as a destination address.

5. The provider network as recited in claim 1, wherein the provider network includes a separate customer private network for each of one or more of the customers of the provider network, wherein each customer private network includes one or more components of the provider network assigned to the respective customer.

6. The provider network as recited in claim 5, wherein the one or more network devices on the provider network comprises a plurality of network devices, and wherein, for the other packet for which the customer IP address is currently mapped to the particular endpoint on the customer network external to the provider network:
one of the plurality of network devices receives the packet from the client device, determines that the destination address of the packet is mapped to the particular endpoint on the customer network external to the provider network, and routes the packet over a customer private network via one or more other network devices of the plurality of network devices, wherein at least one of the one or more other network devices is a component of the customer private network on the provider network; and
one of the one or more other network devices receives the packet via the customer private network, translates the destination address of the packet, encapsulates the packet according to the private communications channel protocol to generate the encapsulated packet, and sends the encapsulated packet to the customer network via the private communications channel.

7. The provider network as recited in claim 6, wherein, to route the packet over the customer private network via the one or more other network devices, the one of the plurality of network devices encodes the packet according to a network protocol of the provider network to form a customer private network packet for transmission on the customer private network.

8. The provider network as recited in claim 6, wherein a path over the customer private network via which the packet is routed includes one or more customer private network appliances configured to apply one or more customer private network-specific networking functions to packets routed through the network appliances.

9. The provider network as recited in claim 8, wherein the one or more customer private network appliances include one or more of firewalls, packet inspection appliances, security appliances, acceleration caches, and load balancers.

10. The provider network as recited in claim 1, wherein the provider network is a virtualized service provider network configured to provide a plurality of virtualized resource instances on the provider network to the customers of the provider network, wherein the provider network is configured to assign subsets of the plurality of virtualized resource instances to the customers as customer resource instances.

11. The provider network as recited in claim 10, wherein the provider network is further configured to form a customer private network on the provider network for a particular customer, wherein the customer private network includes at least a subset of the plurality of virtualized resource instances assigned to the particular customer.

12. The provider network as recited in claim 10, wherein the plurality of virtualized resource instances includes virtualized computation resources and virtualized storage resources.

13. The provider network as recited in claim 10, wherein the mapping information maps at least one customer IP address to a customer resource instance assigned to a respective customer.

14. The provider network as recited in claim 10, wherein the provider network further comprises one or more devices configured to implement at least one virtualization service and at least one application programming interface (API) to the at least one virtualization service, wherein the at least one virtualization service is configured to:
- assign a subset of the plurality of public IP addresses to a customer as customer IP addresses in response to input received via the at least one API;
- assign a subset of the plurality of resource instances on the provider network to the customer as customer resource instances in response to input received via the at least one API;
- map at least one customer IP address assigned to the customer to a particular customer resource instance assigned to the customer in response to input received via the at least one API; and
- map at least one other customer IP address assigned to the customer to a particular endpoint on a customer network of the customer in response to input received via the at least one API.

15. A method, comprising:
- assigning, by one or more server devices on a provider network, subsets of a plurality of public Internet Protocol (IP) addresses to particular customers of the provider network as customer IP addresses, wherein the customer IP addresses are published external to the provider network and external to one or more customer networks of the particular customers as addresses associated with one or more network devices on the provider network;
- maintaining, by the one or more server devices, mapping information that indicates mappings of the customer IP addresses to particular endpoints, wherein the mappings are specified by the customers of the provider network, and wherein at least one customer IP address is currently mapped to an endpoint on the provider network and at least one other customer IP address is currently mapped to an endpoint external to the provider network;
- receiving, by the one or more network devices on the provider network, packets from client devices external to the provider network and external to the one or more customer networks, the packets indicating respective customer IP addresses as respective destination addresses and respective IP addresses of the client devices as respective source addresses;
- for at least some of the packets, determining, from the mapping information, whether a given customer IP address is currently mapped to a given endpoint on the provider network or is currently mapped to a given endpoint on a customer network external to the provider network;
- for a packet for which the customer IP address is currently mapped to a particular endpoint on the provider network, sending the packet to the particular endpoint via the provider network; and
- for another packet for which the customer IP address is currently mapped to a particular endpoint on a customer network external to the provider network:
  - translating the customer IP address to determine a network address of the particular endpoint on the customer network; and
  - transmitting the other packet from the provider network to the customer network via a private communications channel, wherein the transmitted other packet indicates the network address of the particular endpoint on the customer network as the destination address.

16. The method as recited in claim 15, wherein the private communications channel is over a direct connection between the provider network and the customer network.

17. The method as recited in claim 15, wherein the private communications channel is a tunneling technology channel over a public network.

18. The method as recited in claim 15, wherein the transmitted packet further indicates a network address of one of the network devices on the provider network as a source address, and wherein the method further comprises:
- receiving, on the provider network, a response packet from the customer network via the private communications channel, wherein the response packet indicates the network address of the endpoint on the customer network as a source address and the network address of the one of the network devices on the provider network as a destination address;
- translating the source address and the destination address of the response packet to determine the customer IP address and the IP address of the client device; and
- sending the response packet to the client device, wherein the response packet sent to the client device indicates the customer IP address as a source IP address and the IP address of the client device as a destination address.

19. The method as recited in claim 15, wherein the provider network includes a separate customer private network for each of one or more of the customers of the provider network, wherein each customer private network includes one or more components of the provider network assigned to the respective customer.

20. The method as recited in claim 19, wherein the one or more network devices on the provider network comprises a plurality of network devices, and wherein, for the other packet for which the customer IP address is currently mapped to the particular endpoint on the customer network external to the provider network:
- one of the plurality of network devices of the provider network performs said receiving the packet from the client device and said determining that the destination address of the packet is mapped to the particular endpoint on the customer network external to the provider network, and wherein the method further comprises the one of the plurality of network devices routing the packet over a customer private network via one or more other network devices of the plurality of network devices, wherein at least one of the other network devices is a component of the customer private network on the provider network; and
- one of the one or more other network devices receives the packet via the customer private network and performs said translating the customer IP address to determine the network address of the particular endpoint on the customer network and said transmitting the packet from the provider network to the customer network via the private communications channel.

21. The method as recited in claim 20, wherein the method further comprises applying, by one or more customer private network appliances on a path over the customer private network via which the packet is routed, one or more networking functions to the packet, wherein the one or more customer private network appliances include one or more of firewalls, packet inspection appliances, security appliances, acceleration caches, and load balancers.

22. The method as recited in claim 15, wherein the provider network is a virtualized service provider network configured to provide a plurality of virtualized resource instances on the provider network to the customers of the provider network, and wherein the method further comprises assigning subsets of the plurality of resource instances to the customers as customer resource instances.

23. The method as recited in claim 22, further comprising forming a customer private network on the provider network for a particular customer, wherein the customer private network includes at least a subset of the plurality of resource instances assigned to the particular customer.

24. The method as recited in claim 22, wherein the mapping information maps at least one customer IP address of the plurality of customer IP addresses to a customer resource instance assigned to a respective customer.

25. The method as recited in claim 22, further comprising:
receiving input mapping at least one customer IP address assigned to a customer to a customer resource instance assigned to the customer; and
receiving input mapping at least one other customer IP address assigned to the customer to an endpoint on a customer network of the customer.

26. A non-transitory computer-accessible storage medium storing program instructions computer-executable to implement:
receiving, on a provider network, a plurality of packets from client devices external to the provider network and external to one or more customer networks of customers of the provider network, wherein each packet indicates one of a plurality of public Internet Protocol (IP) addresses assigned to the customers of the provider network as customer IP addresses as a destination address and an IP address of one of the client devices as a source address, wherein the customer IP addresses are published external to the provider network and external to customer networks as addresses associated with one or more network devices on the provider network;
for each received packet, determining an endpoint to which the respective destination address is mapped, wherein the destination address of at least one received packet is mapped to an endpoint on a customer network external to the provider network and the destination address of at least one other received packet is mapped to an endpoint on the provider network;
for each packet for which the destination address is currently mapped to an endpoint on the provider network, sending the packet to the respective endpoint via the provider network; and
for each packet for which the destination address is mapped to an endpoint on a customer network external to the provider network:
translating the destination address of the packet to determine a network address of the endpoint on the customer network;
encoding the packet according to a private communications channel protocol to generate an encoded packet, wherein the encoded packet indicates the network address of the endpoint on the customer network as a destination address; and
transmitting the encoded packet from the provider network to the customer network via a private communications channel.

27. The non-transitory computer-accessible storage medium as recited in claim 26, wherein the private communications channel is over a direct connection between the provider network and the customer network.

28. The non-transitory computer-accessible storage medium as recited in claim 26, wherein the private communications channel is a tunneling technology channel over a public network.

29. The non-transitory computer-accessible storage medium as recited in claim 26, wherein said encoding the packet according to a private communications channel protocol to generate an encoded packet comprises encapsulating the packet according to the private communications channel protocol.

30. The non-transitory computer-accessible storage medium as recited in claim 26, wherein the program instructions are further computer-executable to implement:
receiving, on the provider network, a response packet from the customer network via the private communications channel, wherein the response packet indicates the network address of the endpoint on the customer network as a source address and a network address of an endpoint on the provider network as a destination address;
translating the source address and the destination address of the response packet to determine a customer IP address of the respective customer and an IP address of a client device to which the response packet is to be routed; and
sending the response packet to the client device, wherein the response packet sent to the client device indicates the customer IP address as a source IP address and the IP address of the client device as a destination address.

31. The non-transitory computer-accessible storage medium as recited in claim 26, wherein the program instructions are further computer-executable to implement routing at least one packet for which the destination address is mapped to the endpoint on the customer network external to the provider network through a customer private network, wherein the customer private network includes two or more components of the provider network assigned to the respective customer.

32. The non-transitory computer-accessible storage medium as recited in claim 31, wherein at least one component of the customer private network applies a networking function to the packet prior to said transmitting the packet from the provider network to the customer network via the private communications channel, wherein the two or more components of the customer private network include one or more of firewalls, packet inspection appliances, security appliances, acceleration caches, and load balancers.

33. The non-transitory computer-accessible storage medium as recited in claim 26, wherein the provider network is a virtualized service provider network configured to provide a plurality of virtualized resource instances on the provider network to the customers of the provider network, and wherein the program instructions are further computer-executable to implement assigning subsets of the plurality of resource instances to the customers as customer resource instances.

34. The non-transitory computer-accessible storage medium as recited in claim 33, wherein the program instructions are further computer-executable to implement forming a customer private network on the provider network for a particular customer, wherein the customer private network includes at least a subset of the plurality of resource instances assigned to the particular customer.

35. The non-transitory computer-accessible storage medium as recited in claim 26, wherein the program instructions are further computer-executable to implement:
  mapping at least one customer IP address assigned to the customer to a resource instance on the provider network assigned to the customer; and
  mapping at least one other customer IP address assigned to the customer to an endpoint on a customer network of the customer.

* * * * *